(12) United States Patent
Duyvesteyn et al.

(10) Patent No.: US 8,257,580 B2
(45) Date of Patent: *Sep. 4, 2012

(54) DRY, STACKABLE TAILINGS AND METHODS FOR PRODUCING THE SAME

(75) Inventors: Willem P. C. Duyvesteyn, Reno, NV (US); Julian Kift, Reno, NV (US)

(73) Assignee: Marathon Oil Canada Corporation, Calgary, Alberta (CA)

( * ) Notice: Subject to any disclaimer, the term of this patent is extended or adjusted under 35 U.S.C. 154(b) by 539 days.

This patent is subject to a terminal disclaimer.

(21) Appl. No.: 12/512,758

(22) Filed: Jul. 30, 2009

(65) Prior Publication Data

US 2009/0301937 A1    Dec. 10, 2009

Related U.S. Application Data

(63) Continuation-in-part of application No. 12/041,554, filed on Mar. 3, 2008, now Pat. No. 7,985,333, which is a continuation-in-part of application No. 11/249,234, filed on Oct. 12, 2005, now Pat. No. 7,909,989.

(60) Provisional application No. 60/617,739, filed on Oct. 13, 2004.

(51) Int. Cl.
    *C10G 1/04* (2006.01)
(52) U.S. Cl. .......................................... 208/390; 208/45
(58) Field of Classification Search .................... 208/45, 208/390
    See application file for complete search history.

(56) References Cited

U.S. PATENT DOCUMENTS

| 2,871,180 A | 1/1959 | Lowman |
| 3,131,141 A | 4/1964 | West |
| 3,484,365 A | 12/1969 | Pitchford |
| 3,527,692 A | 9/1970 | Titus |
| 3,565,593 A | 2/1971 | Moore et al. |
| 3,565,594 A | 2/1971 | Moore |
| 3,779,902 A | 12/1973 | Mitchell et al. |
| 4,035,282 A | 7/1977 | Stuchberry et al. |
| 4,046,668 A | 9/1977 | Farcasiu et al. |
| 4,054,506 A | 10/1977 | Hart, Jr. et al. |
| 4,120,773 A | 10/1978 | Ridgway |
| 4,120,777 A | 10/1978 | Globus |
| 4,139,450 A | 2/1979 | Hanson et al. |

(Continued)

FOREIGN PATENT DOCUMENTS

CA    2224615    6/1999

(Continued)

OTHER PUBLICATIONS

International Search Report from International Application No. PCT/US2006/08263.

(Continued)

*Primary Examiner* — Walter D Griffin
*Assistant Examiner* — Renee E Robinson
(74) *Attorney, Agent, or Firm* — Holland & Hart LLP

(57) ABSTRACT

Methods for preparing solvent-dry, stackable tailings. The methods may include a primary leaching or extraction process that separates most of the bitumen from a material comprising bitumen and produces first solvent-wet tailings. The first solvent-wet tailings are washed with a second solvent that removes the first solvent from the tailings. Second solvent remaining in the tailings is removed to thereby produce solvent-dry, stackable tailings.

39 Claims, 6 Drawing Sheets

U.S. PATENT DOCUMENTS

| | | | |
|---|---|---|---|
| 4,222,873 A | 9/1980 | Parsons |
| 4,224,138 A | 9/1980 | Kruyer |
| 4,250,016 A | 2/1981 | Estes et al. |
| 4,308,133 A | 12/1981 | Meyer |
| 4,347,118 A | 8/1982 | Funk et al. |
| 4,490,259 A | 12/1984 | Coffing |
| 4,512,872 A | 4/1985 | Chung et al. |
| 4,589,980 A | 5/1986 | Keys |
| 4,592,826 A | 6/1986 | Ganguli |
| 4,596,651 A | 6/1986 | Wolff et al. |
| 4,612,113 A | 9/1986 | Kallioinen |
| 4,678,561 A | 7/1987 | Keys |
| 4,678,562 A | 7/1987 | Keys |
| 4,724,272 A | 2/1988 | Raniere et al. |
| 4,744,890 A | 5/1988 | Miller et al. |
| 4,846,964 A | 7/1989 | Scott et al. |
| 4,859,317 A | 8/1989 | Shelfantook et al. |
| 5,044,552 A | 9/1991 | Becker et al. |
| 5,084,160 A | 1/1992 | Stewart et al. |
| 5,143,598 A * | 9/1992 | Graham et al. ............... 208/390 |
| 5,176,802 A | 1/1993 | Duyvesteyn et al. |
| 5,223,148 A | 6/1993 | Tipman et al. |
| 5,236,577 A | 8/1993 | Tipman et al. |
| 5,295,665 A | 3/1994 | Mackie |
| 5,389,274 A | 2/1995 | Fernandez |
| 5,443,158 A | 8/1995 | McKenny et al. |
| 5,485,883 A | 1/1996 | Rippetoe et al. |
| 5,520,799 A | 5/1996 | Brown et al. |
| 5,534,136 A | 7/1996 | Rosenbloom |
| 5,538,081 A | 7/1996 | Rippetoe et al. |
| 5,554,301 A | 9/1996 | Rippetoe et al. |
| 5,626,743 A | 5/1997 | Humphreys |
| 5,626,793 A | 5/1997 | Reiffenrath et al. |
| 5,670,056 A | 9/1997 | Yoon et al. |
| 5,670,345 A | 9/1997 | Srivastava et al. |
| 5,702,612 A | 12/1997 | Wang |
| 5,728,202 A | 3/1998 | Nelson et al. |
| 5,795,466 A | 8/1998 | Kelebek et al. |
| 5,798,137 A | 8/1998 | Lord et al. |
| 5,849,201 A | 12/1998 | Bradley |
| 5,872,289 A | 2/1999 | Appleby et al. |
| 5,876,592 A | 3/1999 | Tipman et al. |
| 5,896,435 A | 4/1999 | Gautier et al. |
| 5,961,786 A | 10/1999 | Freel et al. |
| 5,968,349 A | 10/1999 | Duyvesteyn et al. |
| 5,992,050 A | 11/1999 | Kemper et al. |
| 6,007,709 A | 12/1999 | Duyvesteyn et al. |
| 6,036,849 A | 3/2000 | Rippetoe et al. |
| 6,074,558 A | 6/2000 | Duyvesteyn et al. |
| 6,106,787 A | 8/2000 | Rippetoe |
| 6,214,213 B1 | 4/2001 | Tipman et al. |
| 6,320,148 B1 | 11/2001 | Yoon et al. |
| 6,352,639 B2 | 3/2002 | Ito et al. |
| 6,427,843 B1 | 8/2002 | Clark |
| 6,514,310 B2 | 2/2003 | Allemand et al. |
| 6,589,417 B2 | 7/2003 | Taciuk et al. |
| 6,595,163 B2 | 7/2003 | Dumaz et al. |
| 6,764,542 B1 | 7/2004 | Lackey et al. |
| 6,768,015 B1 | 7/2004 | Luxem et al. |
| 6,793,079 B2 | 9/2004 | Khan et al. |
| 6,822,105 B1 | 11/2004 | Luxem et al. |
| 6,827,786 B2 | 12/2004 | Lord |
| 6,827,841 B2 | 12/2004 | Kiser et al. |
| 6,871,743 B2 | 3/2005 | Yoon et al. |
| 6,936,227 B1 | 8/2005 | De Souza et al. |
| 6,965,044 B1 | 11/2005 | Hammond et al. |
| 6,989,091 B2 | 1/2006 | Jorgensen |
| 7,018,435 B1 | 3/2006 | Wentinck |
| 7,097,675 B2 | 8/2006 | Detering et al. |
| 7,464,756 B2 | 12/2008 | Gates et al. |
| 7,588,682 B2 | 9/2009 | Norman |
| 7,824,453 B2 | 11/2010 | Duyvesteyn |
| 7,909,989 B2 | 3/2011 | Duyvesteyn et al. |
| 7,985,333 B2 | 7/2011 | Duyvesteyn |
| 2002/0134704 A1 | 9/2002 | Mitchell et al. |
| 2005/0070218 A1 | 3/2005 | Phillips et al. |
| 2005/0092682 A1 | 5/2005 | Phillips et al. |
| 2006/0076274 A1 | 4/2006 | Duyvesteyn et al. |
| 2006/0144760 A1 | 7/2006 | Duyvesteyn et al. |
| 2007/0170095 A1 | 7/2007 | Freel et al. |
| 2007/0209971 A1 | 9/2007 | Duyvesteyn et al. |
| 2007/0284283 A1 | 12/2007 | Duyvesteyn et al. |
| 2008/0060257 A1 | 3/2008 | Duyvesteyn |
| 2008/0156702 A1 | 7/2008 | Duyvesteyn |
| 2009/0090654 A1 | 4/2009 | Duyvesteyn et al. |
| 2009/0145809 A1 | 6/2009 | Ledbetter, Jr. et al. |
| 2009/0294332 A1 | 12/2009 | Ryu |
| 2009/0301937 A1 | 12/2009 | Duyvesteyn et al. |
| 2010/0032348 A1 | 2/2010 | Duyvesteyn et al. |
| 2011/0017642 A1 | 1/2011 | Duyvesteyn |
| 2011/0062057 A1 | 3/2011 | Duyvesteyn |
| 2011/0155648 A1 | 6/2011 | Duyvesteyn et al. |

FOREIGN PATENT DOCUMENTS

| | | |
|---|---|---|
| WO | WO 01/32936 | 5/2001 |
| WO | WO 03/072506 | 9/2003 |
| WO | WO 2007/102819 | 9/2007 |
| WO | WO 2011/082209 | 7/2011 |

OTHER PUBLICATIONS

International Search Report from International Application No. PCT/US2005/36728.

Hong, P.K. Andrew, et al., "A Polar-Nonpolar, Acetic Acid/Heptane, Solvent Medium for Degradation of Pyrene by Ozone", Ind. Eng. Chem. Res. 2004, vol. 43, pp. 7710-7715.

Biodiesel Processing, Mar. 22, 2004 (3 pp.).

Biodiesel Processing, biodiesel Handout for 2005 New Hampshire Science Tearher's Association Workshop UNH Biodiesel Group, http://www.unh.edu/p2/biodiesel, 2005 (27 pp.).

Campbell, National Biodiesel Board 2005 Annual Meeting, Marina Marriott, Ft. Lauderdale, FL, Feb. 1, 2005 (9 pp.).

Cohen et al., "Degradation of Coal by Fungi Polyporus Versicolor and Poria Monticola," Appl. Enviorn. Microbiol., 44(1):23-27, Jul. 1982 (5 pp.).

Desolventizer-Toaster, Crown Iron Works Company, PDF file created Feb. 16, 2010, (3 pp.).

Gallmetzer et al., "Efflux of Organic Acids in Penicillium Simplicissimum is an Energy-Spilling Porcess . . . ," Microbiology 148:1143-1149, 2002 (7 pp.).

Houdaille, "Jet Pump Techinical Data—Puming Liquids," pp. 1-11, 1982 (12 pp.).

International Search Report, PCT/US10/43822, Nov. 29, 2010 (4 pp.).

International Search Report, PCT/US10/43082, Sep. 14, 2010 (11 pp.).

International Search Report and Written Opinion, PCT/US09/35552, Apr. 17, 2009 (8 pp.).

International Search Report and Written Opinion, PCT/US07/19222, Apr. 28, 2008 (8 pp.).

International Search Report, PCT/US2005/34092, Jul. 26, 2007 (6 pp.).

Lewis, "Liquefied Petroleum Gas," Hawley's condensed Chemical Dictionary (14th Edition), John Wiley Sons. , 2002 (1 p.).

Rogoff et al., "The Microbiology of Coal," Bureau of Mines, U.S. Dept. of the Interior, Region V, Bruceton, PA, 73:264-268, Aug. 23, 1956 (5 pp.).

Soygold, Environmental Solutions to Your Market Challenges, http://www.soygold.com/applications.htm, printed Mar. 6, 2007 (2 pp.).

Vicente et al., "A Comparative Study of Vegetable Oils for Biodiesel Production in Spain," Energy & Fuels, 20:394-398, 2006 (published on Web Nov. 8, 2005) (5 pp.).

International Search Report, PCT/US2010/62133, Aug. 30, 2011 (3 pp.).

U.S. Appl. No. 13/273,975, filed Oct. 14, 2011, Process for Extracting Bitumen and Drying the Tailings.

U.S. Appl. No. 12/964,612, filed Dec. 9, 2010, Process for Extracting Bitumen and Drying the Tailings.

U.S. Appl. No. 12/956,701, filed Nov. 30, 2010, Methods for Extracting Bitumen from Bituminous Materials.

U.S. Appl. No. 12/692,127, filed Jan. 22, 2010, Methods fro Extracting Bitumen from Bituminous Material.

* cited by examiner

DRY, STACKABLE TAILINGS AND METHODS FOR PRODUCING THE SAME

CROSS REFERENCE TO RELATED PATENT APPLICATIONS

This patent application is a continuation-in-part of U.S. patent Ser. No. 12/041,554 U.S. Pat. No. 7,985,333, entitled "System and Method of Separating Bitumen from Tar Sand," filed Mar. 3, 2008, published as U.S. Patent Application Publication No. 2008/0210602, which is a continuation-in-part of U.S. patent Ser. No. 11/249,234 U.S. Pat. No. 7,909,989, entitled "Method for Obtaining Bitumen from Tar Sands," filed on Oct. 12, 2005, published as U.S. Patent Application Publication No. 2006/0076274, which claims priority to U.S. Provisional Patent Application Ser. No. 60/617,739, filed on Oct. 13, 2004, all of which are incorporated herein by reference in their entireties. In the event of a conflict, the subject matter explicitly recited or shown herein controls over any subject matter incorporated by reference. All definitions of a term (express or implied) contained in any of the subject matter incorporated by reference herein are hereby disclaimed.

BACKGROUND

Bitumen is a heavy type of crude oil that is often found in naturally occurring geological materials such as tar sands, black shales, coal formations, and weathered hydrocarbon formations contained in sandstones and carbonates. Bitumen may be described as flammable brown or black mixtures or tarlike hydrocarbons derived naturally or by distillation from petroleum. Bitumen can be in the form of a viscous oil to a brittle solid, including asphalt, tars, and natural mineral waxes. Substances containing bitumen may be referred to as bituminous, e.g., bituminous coal, bituminous tar, or bituminous pitch. At room temperature, the flowability of bitumen is much like cold molasses. Bitumen may be processed to yield oil and other commercially useful products, primarily by cracking the bitumen into lighter hydrocarbon material.

As noted above, tar sands represent one of the well known sources of bitumen. Tar sands typically include bitumen, water, and mineral solids. The mineral solids can include inorganic solids such as coal, sand, and clay. Tar sand deposits can be found in many parts of the world, including North America. One of the largest North American tar sands deposits is in the Athabasca region of Alberta, Canada. In the Athabasca region, the tar sands formation can be found at the surface, although it may be buried two thousand feet below the surface overburden or more.

Tar sands deposits can be measured in barrels equivalent of oil. It is estimated that the Athabasca tar sands deposit contains the equivalent of about 1.7 to 2.3 trillion barrels of oil. Global tar sands deposits have been estimated to contain up to 4 trillion barrels of oil. By way of comparison, the proven worldwide oil reserves are estimated to be about 1.3 trillion barrels.

The bitumen content of some tar sands may vary from approximately 3 wt % to 21 wt %, with a typical content of approximately 12 wt %. As such, an initial step in deriving oil and other commercially useful products from bitumen typically may require extracting the bitumen from the naturally occurring geological material. In the case of tar sands, this may include separating the bitumen from the mineral solids and other components of tar sands.

One conventional process for separating bitumen from mineral solids and other components of tar sands includes mixing the tar sands with hot water and, optionally, a process aid such as caustic soda (see, e.g., U.S. Pat. No. 1,791,797). Agitation of this mixture releases bitumen from the tar sands and allows air bubbles to attach to the released bitumen droplets. These air bubbles float to the top of the mixture and form a bitumen-enriched froth. The froth may include around 60% bitumen, 30% water, and 10% inorganic minerals. The bitumen-enriched froth is separated from the mixture, sometimes with the aid of a solvent, and further processed to isolate the bitumen product. For example, the froth may be treated with an aliphatic (pentane-type) or an aromatic (naphtha-type) solvent to produce a clean bitumen product that may serve as a refinery upgrader feed stock. The bulk of the mineral solids can also be removed to form a tailings stream. The tailings stream may also include water, solvent, precipitated asphaltenes (in the case where the asphaltene is not soluble in the solvent used to separate the bitumen-enriched froth from the mixture), and some residual bitumen.

Tailings produced by the hot water process and/or the froth treatment process pose several problems. Firstly, as noted above, the tailings produced by conventional methods may include precipitated asphaltenes and/or residual bitumen. The bitumen and asphaltenes in a tailings stream represent unrecovered hydrocarbon that will not be processed into valuable commercial products. Accordingly, the conventional methods result in a lower yield of hydrocarbon material, and consequently, diminished profit.

Additionally, the presence of bitumen and asphaltene in the tailings may complicate the disposal of the tailings because theses hydrocarbons can present environmental risks. This may also be true for residual solvent included in the tailings that may be environmentally unfriendly.

The amount of tailings produced by conventional methods may also present significant problems. In some circumstances, the total volume of the tailings produced by the conventional methods may be more than the volume of mined tar sands, which means that not all of the tailings can be returned to the mined area.

The physical characteristics of the tailings may also present significant problems. The conventional methods utilize water and caustic as part of the process. This may result in the activation and swelling of certain clay components of a tailings stream. As such, the tailings have a sludge-like consistency that can last indefinitely. The sludge-like consistency means that the tailings are not stackable, thereby severely limiting the manner in which to dispose of the tailings. Often the only disposal option is to deposit the tailings in a tailings pond located outside of the mine area. These ponds are costly to build and maintain and can be damaging to the local environment, including the local water supply. Furthermore, ponds can be damaging to the local wildlife population, such as birds, which can be caught in the oil and solvent laden tailings produced by hot-water extraction processes.

One known method for separating bitumen from tar sands that also produces a tailings stream is described in U.S. Pat. No. 4,347,118 (the '118 patent). The '118 patent discloses a method in which pentane is used to extract bitumen from tar sands. The pentane solvent does not dissolve the asphaltene fraction of the bitumen that is not pentane soluble. Thus, this fraction of the bitumen remains as a solid and is discharged with the tailings. The precipitated C5 asphaltene possesses a complex, card-house type structure that tends to include bitumen and/or solvent, resulting in additional losses of hydrocarbons with the tailings. For Athabasca-type bitumen, the asphaltene precipitate alone can result in a significant loss of the total initial hydrocarbon content of the tar sands, and original bitumen can also be lost to tailings due to inclusions in the asphaltene precipitate.

U.S. Pat. No. 5,143,598 (the '598 patent) discloses a method that includes adding heptane to tar sands to form a bitumen-rich heptane phase and then displacing the bitumen-rich heptane phase with water. The use of heptane can result in the precipitation of the heptane insoluble C7 asphaltene fraction present in the bitumen phase. The heptane insoluble asphaltene fraction is discharged with the tailings. In addition, using water not only results in undesirable swelling of clays in the tar sands, but also can form undesirable emulsions with the lighter hydrocarbon fraction of bitumen that are quite difficult to break.

SUMMARY

Disclosed are embodiments of a method for producing solvent-dry, stackable tailings, and the solvent-dry, stackable tailings produced therefrom. In some embodiments, the method may include a first solvent extraction step performed on material comprising bitumen, a separation step to separate a bitumen-enriched solvent phase and form first solvent-wet tailings, a separation step including the addition of second solvent to the first solvent-wet tailings to displace the first solvent from the first solvent-wet tailings, and a separation step to remove second solvent from the second solvent-wet tailings produced after second solvent displaces the first solvent in the first solvent-wet tailings. In certain embodiments, the addition of first and second solvents to material comprising bitumen may be performed without substantial separation steps. Rather, the solvents may be allowed to flow through the stationary material comprising bitumen to thereby remove bitumen and first solvent from the material comprising bitumen. Such methods may produce solvent-dry, stackable tailings stream that are easier to dispose of and more environmentally friendly than tailings streams produced by known methods for extracting bitumen from material comprising bitumen.

In some embodiments, a method for producing solvent-dry, stackable tailings may include a step of mixing a first material comprising bitumen with a first solvent to form a first mixture. The first mixture may include a bitumen-enriched solvent phase. The method also may include a step of separating the bitumen-enriched solvent phase from the first mixture. Separation of the bitumen-enriched solvent phase from the first mixture may result in the first mixture becoming first solvent-wet tailings that include a first solvent component. The method may further include a step of separating the first solvent component from the first solvent-wet tailings. This separation may be carried out by adding a second solvent to the first solvent-wet tailings, with the second solvent displacing the first solvent in the first solvent-wet tailings. This step may result in the first solvent-wet tailings becoming second solvent-wet tailings, with the second-solvent wet tailings including a second solvent component. The method may also include a step of separating the second solvent component from the second solvent-wet tailings to thereby form solvent-dry, stackable tailings.

In some embodiments, a method for producing solvent-dry, stackable tailings may include a step of mixing a first material comprising bitumen with a first quantity of first solvent to form a first mixture. The method may also includes a step of loading the first mixture into a vertical column having a top end and a bottom end. A step of injecting a second quantity of first solvent into the first mixture loaded in the vertical column at the top end of the vertical column may also be included. The method may further include a step of collecting a bitumen-enriched solvent phase at the bottom end of the vertical column. The method may also include a step of injecting a first quantity of second solvent into the first mixture loaded in the vertical column at the top end of the vertical column. Additionally, the method may include the step of collecting a first solvent-enriched second solvent phase at the bottom end of the vertical column. The method may also include a step of discharging the first mixture from the vertical column.

It is to be understood that the foregoing is a brief summary of various aspects of some disclosed embodiments. The scope of the disclosure need not therefore include all such aspects or address or solve all issues noted in the background above. In addition, there are other aspects of the disclosed embodiments that will become apparent as the specification proceeds.

The foregoing and other features, utilities, and advantages of the subject matter described herein will be apparent from the following more particular description of certain embodiments as illustrated in the accompanying drawings. In this regard, it is to be understood that the scope of the invention is to be determined by the claims as issued and not by whether given subject includes any or all features or aspects noted in this Summary or addresses any issues noted in the Background.

BRIEF DESCRIPTION OF THE DRAWINGS

The preferred and other embodiments are disclosed in association with the accompanying drawings in which.

DETAILED DESCRIPTION

Before describing the details of the various embodiments herein, it should be appreciated that the terms "solvent," "a solvent" and "the solvent" include one or more than one individual solvent compounds unless expressly indicated otherwise. Mixing solvents that include more than one individual solvent compound with other materials can include mixing the individual solvent compounds simultaneously or serially unless indicated otherwise. It should also be appreciated that the term "tar sands" includes oil sands. The separations described herein can be partial, substantial or complete separations unless indicated otherwise. All percentages recited herein are volume percentages unless indicated otherwise.

Tar sands are used throughout this disclosure as a representative material comprising bitumen. However, the methods and systems disclosed herein are not limited to processing of tar sands. Any material comprising bitumen may be processed by the methods and systems disclosed herein.

Figure 1:
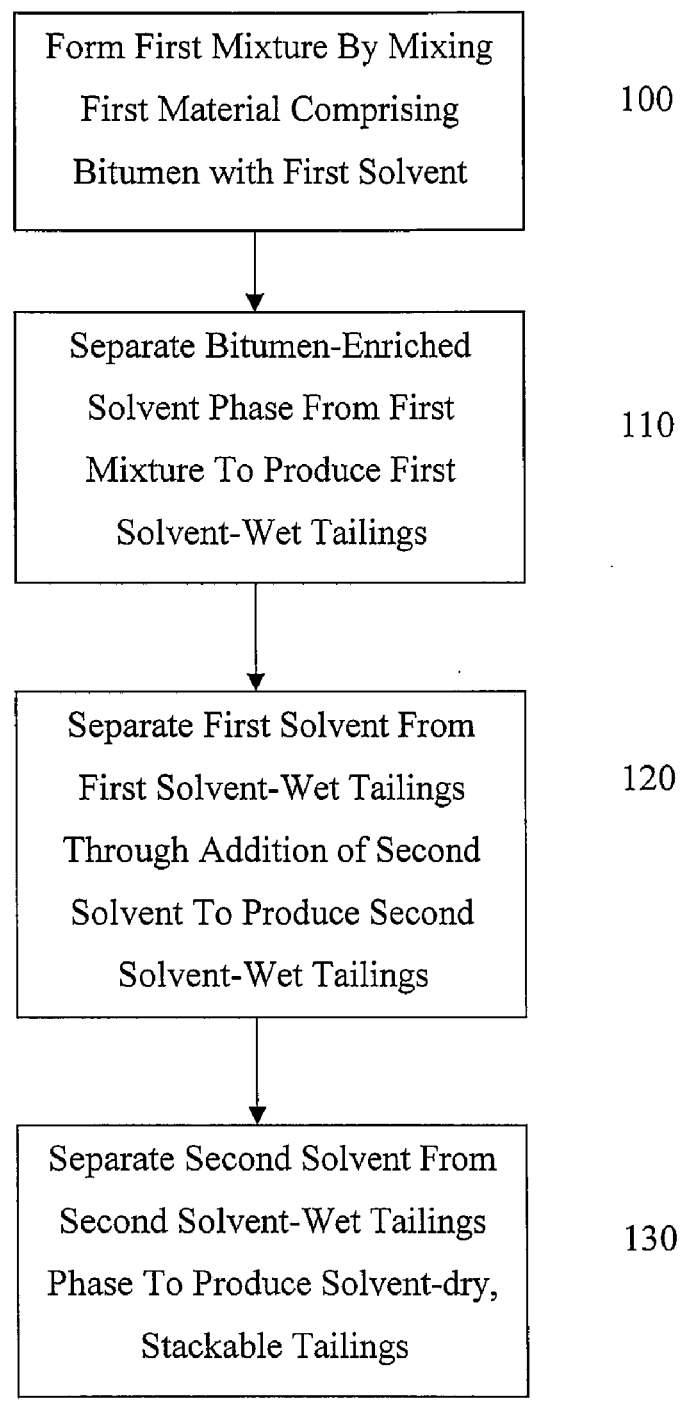
FIG. 1 is a flow chart detailing a method for producing solvent-solvent-dry, stackable tailings as disclosed herein.

With reference to FIG. 1, one embodiment of a method for producing solvent-dry, stackable tailings may include mixing 100 a first quantity of material comprising bitumen with a first solvent to form a first mixture, separating 110 a bitumen-enriched solvent phase from the first mixture to thereby form first solvent-wet tailings, separating 120 first solvent from the first solvent-wet tailings by adding second solvent to the first solvent-wet tailings and thereby forming second solvent-wet tailings, and separating 130 second solvent from the second solvent-wet tailings to thereby form solvent-dry, stackable tailings.

Mixing 100 a first quantity of material comprising bitumen with a first solvent to form a first mixture represents a solvent extraction step (also sometimes referred to as dissolution, solvation, or leaching). Solvent extraction is a process of separating a substance from a material by dissolving the substance of the material in a liquid. In this situation, the material comprising bitumen is mixed with one or more solvents to dissolve bitumen in the solvent and thereby separate it from the other components of the material comprising bitumen (e.g., the mineral solids of tar sands).

The first solvent used in the mixing step may include a hydrocarbon solvent. Any suitable hydrocarbon solvent or mixture of hydrocarbon solvents that is capable of dissolving bitumen may be used. In some embodiments, the hydrocarbon solvent may be a hydrocarbon solvent that does not result in asphaltene precipitation. The hydrocarbon solvent or mixture of hydrocarbon solvents can be economical and relatively easy to handle and store. The hydrocarbon solvent or mixture of hydrocarbon solvents may also be generally compatible with refinery operations.

In some embodiments, the first solvent may be a light aromatic solvent. The light aromatic solvent may be an aromatic compound having a boiling point temperature less than about 400° C. at atmospheric pressure. In some embodiments, the light aromatic solvent used in the first mixing step may be an aromatic having a boiling point temperature in the range of from about 75° C. to about 350° C. at atmospheric pressure, and more specifically, in the range of from about 100° C. to about 25° C. at atmospheric pressure.

It should be appreciated that the light aromatic solvent need not be 100% aromatic compounds. Instead, the light aromatic solvent may include a mixture of aromatic and non-aromatic compounds. For example, the first solvent can include greater than zero to about 100 wt % aromatic compounds, such as approximately 10 wt % to 100 wt % aromatic compounds, or approximately 20 wt % to 100 wt % aromatic compounds.

Any of a number of suitable aromatic compounds may be used as the first solvent. Examples of aromatic compounds that can be used as the first solvent include benzene, toluene, xylene, aromatic alcohols and combinations and derivatives thereof. The first solvent can also include compositions, such as kerosene, diesel (including biodiesel), light gas oil, light distillate (distillate having boiling point temperature in the range of from 140° C. to 260° C.), commercial aromatic solvents such as Solvesso 100, Solvesso 150, and Solvesso 200 (also known in the U.S.A. as Aromatic 100, 150, and 200, including mainly $C_{10}$-$C_{11}$ aromatics, and produced by ExxonMobil), and/or naphtha. In some embodiments, the first solvent may have a boiling point temperature of approximately 75° C. to 375° C. Naphtha, for example, is particularly effective at dissolving bitumen and is generally compatible with refinery operations.

The material comprising bitumen used in the mixing step may be any material that includes bitumen. In some embodiments, the material comprising bitumen includes any material including more than 3 wt % bitumen. Exemplary materials comprising bitumen include, but are not limited to, tar sands, black shales, coal formations, and hydrocarbon sources contained in sandstones and carbonates. The material comprising bitumen may be obtained by any known methods for obtaining material comprising bitumen, such as by surface mining, underground mining, or any in situ extraction methods, such as vapor extraction (Vapex) and steam assisted gravity drainage (SAGD) extraction.

The step of mixing a first quantity of material comprising bitumen and a first solvent can be performed as a continuous, batch, or semi-batch process. Continuous processing may typically be used in larger scale implementations. However, batch processing may result in more complete separations than continuous processing.

The material comprising bitumen and the first solvent may be mixed by any suitable manner for mixing two materials for any suitable period of time. The mixing of the material comprising bitumen and the first solvent is preferably carried out to the point of dissolving most, if not all, of the bitumen contained in the material comprising bitumen. In some embodiments, the material comprising bitumen and the first solvent may be mixed in a vessel to dissolve the bitumen and form the first mixture. The vessel can be selectively opened or closed. The vessel used for mixing may also contain mechanisms for stirring and mixing solvent and material comprising bitumen to further promote dissolution of the bitumen in the first solvent. For example, powered mixing devices such as a rotating blade may be provided to mix the contents of the vessel. In another example, the vessel itself may be rotated to cause mixing between the material comprising bitumen and the first solvent.

In certain embodiments, material comprising bitumen and the first solvent may be mixed by virtue of the manner in which the material comprising bitumen and the first solvent are introduced into the vessel. That is to say, the first solvent may be introduced into a vessel already containing material comprising bitumen at a high velocity, thereby effectively agitating and mixing the contents of the vessel. Conversely, the material comprising bitumen may be introduced into a vessel already containing first solvent.

The amount of the first solvent added to the material comprising bitumen may be a sufficient amount to effectively dissolve at least a portion, or desirably all, of the bitumen in the material comprising bitumen. In some embodiments, the amount of the first solvent mixed with the material comprising bitumen may be approximately 0.5 to 3.0 times the amount of bitumen by volume contained in the material comprising bitumen, approximately 0.6 to 2.0 times the amount of the bitumen by volume contained in the material comprising bitumen, or approximately 0.75 to 1.5 times the amount of bitumen by volume contained in the material comprising bitumen.

It should be noted that the ratio of the first solvent to bitumen may be affected by the amount of bitumen in the material comprising bitumen. For example, more solvent may be required for lower grade tars sands ore (e.g., 6 wt % bitumen) than for higher grade tar sands ore (e.g., greater than 12 wt % bitumen).

The first mixture of the first solvent and the material comprising bitumen may generally result in the formation of a bitumen-enriched solvent phase within the first mixture, with the majority of the bitumen from the material comprising bitumen dissolved in the bitumen-enriched solvent phase. In some embodiments, 90%, preferably 95%, and most preferably 99% or more of the bitumen in the material comprising bitumen is dissolved in the first solvent and becomes part of the bitumen-enriched solvent phase.

The bitumen-enriched solvent phase may be separated 110 from the first mixture. Separation of the bitumen-enriched solvent phase from the first mixture may result in the first mixture becoming first solvent-wet tailings. Any suitable process for separating the bitumen-enriched solvent phase from the first mixture may be used, such as by filtering (including filtration via an automatic pressure filter), settling and decanting, or by gravity or gas overpressure drainage.

In some embodiments, the bitumen-enriched solvent phase removed from the first mixture may include from about 5 wt % to about 50 wt % of bitumen and from about 50 wt % to about 95 wt % of the first solvent. The bitumen-enriched solvent phase may include little or no non-bitumen components of the material comprising bitumen (e.g., mineral solids). The first solvent-wet tailings created by removing the bitumen-enriched solvent phase from the first mixture may include from about 75 wt % to about 95 wt % non-bitumen components of the material comprising bitumen and from about 5 wt % to about 25 wt % first solvent. The first solvent component of the first solvent-wet tailings represents first solvent mixed with the material comprising bitumen but which is not removed from the first mixture during separation step 110. This first solvent component of the first solvent-wet tailings may have bitumen dissolved therein. Accordingly, in some embodiments, the first solvent-wet tailings may include from about 50 wt % to about 99 wt % of bitumen.

The vessel for mixing mentioned previously may function as both the mixer and a separator for separating the bitumen-enriched solvent phase from the first mixture. Alternatively, separate vessels can be used for mixing and separating, wherein the first mixture is transported from the mixing vessel to a separation vessel. In some embodiments, the vessel may be divided into sections. One section may be used to mix the material comprising bitumen and the first solvent and another section may be used to separate the bitumen-enriched solvent phase from the first mixture.

The separation of the bitumen-enriched solvent phase from the first mixture can be performed as a continuous, batch, or semi-batch process. Continuous processing may typically be used in larger scale implementations. However, batch processing may result in more complete separations than continuous processing.

Separation of the bitumen-enriched solvent phase from the first mixture by any of the above-described methods may be preceded or followed by applying pressurized gas over the first mixture. Applying a pressurized gas over the first mixture may facilitate the separation of the bitumen-enriched solvent phase from the non-bitumen components of the first solvent-wet tailings. Liberated bitumen-enriched solvent phase can then be removed by applying additional first solvent to the first solvent-wet tailings as described in greater detail below. The addition of additional first solvent may also displace the liberated bitumen-enriched solvent phase from the first solvent-wet tailings by providing a driving force across a filtration element (i.e., the non-bituminous components of the material comprising bitumen). Any suitable gas may be used. In some embodiments, the gas may be nitrogen, carbon dioxide or steam. The gas may also be added over the first mixture in any suitable amount. In some embodiments, 62.5 $ft^3$ to 375 $ft^3$ of gas per ton of material comprising bitumen may be used. This is equivalent to a range of about 4.5 liters to 27 liters of gas per liter of material comprising bitumen. In certain embodiments, 125 $ft^3$ of gas per ton of material comprising bitumen may be used.

In some embodiments, the bitumen-enriched solvent phase may be separated from the first mixture by filtering the first mixture with a plate and frame-type filter press. Any plate and frame-type filter press known to those of ordinary skill in the art may be used. An exemplary plate and frame-type filter press suitable for use in this method is described in U.S. Pat. No. 4,222,873. Generally, the first mixture is pumped into frame chamber located between two filter plates. The first mixture fills the frame chamber and the liquid component of the first mixture migrates out of the frame chamber through the filter cloths of each filter plate, thereby separating the liquid component of the first mixture from the solid component of the first mixture. In this case, the liquid component is the bitumen-enriched solvent phase (i.e., first solvent having bitumen dissolved therein) and the solids component is the first solvent-wet tailings. The bitumen-enriched solvent phase that has passed out of the frame chamber is routed out of the plate and frame-type filter press while the first solvent-wet tailings are left behind in the frame chamber.

When utilizing a plate and frame-type filter press to separate the first mixture, pressurized gas may be injected into the frame chamber after the frame chamber has been filled with the first mixture to promote the separation of the bitumen-enriched solvent phase from mineral solids in the first mixture. The introduction of pressurized gas into the frame chamber may proceed according to the details provided above for applying pressurized gas over a first mixture.

In some embodiments, separating 110 bitumen-enriched solvent phase from the first mixture may include a second separation stage in addition to the separation described above. When the bitumen-enriched solvent phase is removed from the first mixture, a residual amount of bitumen-enriched solvent phase may remain in the first mixture. Because the first mixture includes a residual amount of bitumen-enriched solvent phase, the first mixture may now be considered first solvent-wet tailings. Accordingly, the second separation stage may be performed to remove the residual bitumen-enriched solvent phase from the first solvent-wet tailings.

The second separation stage may be performed by adding a second quantity of first solvent to the first solvent-wet tailings. The addition of a second quantity of first solvent displaces the residual bitumen-enriched solvent phase and thereby forces the residual bitumen-enriched solvent phase out of the first solvent-wet tailings. Some of the second quantity of the first solvent may remain in the first solvent-wet tailings, but little to no bitumen-enriched solvent phase remains. In this manner, the first solvent-wet tailings may remain first solvent-wet tailings even after the second stage of separation, although the first solvent-wet tailing become essentially bitumen-free.

Any suitable amount of first solvent may be added to the first solvent-wet tailings in order to displace the bitumen-enriched solvent phase. In some embodiments, the second quantity of first solvent may be added to the first solvent-wet tailings in an amount of from about 10% to about 200% of the first quantity of first solvent mixed with the material comprising bitumen. The second quantity of first solvent may also be added to the first solvent-wet tailings in any suitable fashion. For example, where the first solvent-wet tailings remain loaded in the frame chamber of a plate and frame-type filter press as described above, the second quantity of first solvent may be added to the frame chamber to displace the residual bitumen-enriched solvent phase out of the first-solvent wet tailings and through the filter screens on either side of the filter chamber.

The solvent used for the second quantity of first solvent may be the same solvent used for the first quantity of first solvent. Alternatively, the solvent used for the second quantity of first solvent may be a different solvent from the solvent used for the first quantity of first solvent. However, the second quantity of first solvent is still of the type of first solvents described in greater detail above (e.g., a light aromatic solvent).

The residual bitumen-enriched solvent phase displaced from the first solvent-wet tailings may include predominantly bitumen and first solvent. In some embodiments, the residual bitumen-enriched solvent phase may include from about 5 wt % to about 50 wt % bitumen and from about 50 wt % to about 95 wt % first solvent. Little to no non-bitumen components of the material comprising bitumen may be present in the residual bitumen-enriched solvent phase. After removal of the residual bitumen-enriched solvent phase, the first solvent-wet tailings may include little or no bitumen. In some embodiments, the first solvent-wet tailings may include from 0 wt % to about 2 wt % bitumen, from about 2 wt % to about 15 wt % first solvent, and from about 83 wt % to about 98 wt % non-bitumen components.

The residual bitumen-enriched solvent phase collected from the second separation stage may be combined with the bitumen-enriched solvent phase collected from the first separation stage prior to any further processing conducted on the bitumen-enriched solvent phase.

In certain embodiments, the second separation stage may be carried out by washing the first solvent-wet tailings with the second quantity of first solvent in a countercurrent process. The countercurrent process may generally include moving the first solvent-wet tailings in one direction while passing the second quantity of first solvent through the first solvent-wet tailings in an opposite direction. For example, the first solvent-wet tailings may be loaded at the bottom of a screw classifier conveyor positioned at an incline, while second quantity of first solvent may be introduced at the top of the screw classifier conveyor. An exemplary screw classifier conveyor suitable for use in this method is described in U.S. Pat. No. 2,666,242. As the screw classifier conveyor moves the first solvent-wet tailings upwardly, the second quantity of first solvent may flow down the inclined screw classifier conveyor and passes through the first solvent-wet tailings. The second quantity of first solvent may displace any residual bitumen-enriched solvent phase contained in the first solvent-wet tailings, thereby "washing" the bitumen from the first solvent-wet tailings.

Separation of the residual bitumen-enriched solvent phase and the first solvent-wet tailings may naturally occur based on the configuration of the screw classifier conveyor, with the predominantly liquid residual bitumen-enriched solvent phase collecting at one end of the washing unit and the predominantly solid first solvent-wet tailings at the opposite end of the washing unit. For example, when an inclined screw classifier conveyor is used, the residual bitumen-enriched solvent phase may collect at the bottom of the screw classifier conveyor, while the first solvent-wet tailings may collect at the top of the screw classifier conveyor. The residual bitumen-enriched solvent phase may include predominantly bitumen and first solvent. In some embodiments, the residual bitumen-enriched solvent phase may include from about 5 wt % to about 50 wt % bitumen and from about 50 wt % to about 95 wt % first solvent. The bitumen-enriched solvent phase may include relatively minor amounts of non-bitumen components of the material comprising bitumen. The first solvent-wet tailings may include predominantly first solvent and non-bitumen components of the material comprising bitumen. The first solvent component of the first solvent-wet tailings may be first solvent that does not pass all the way through the first solvent-wet tailings in the countercurrent washing process. In some embodiments, the first solvent-wet tailings may include from about 5 wt % to about 20 wt % first solvent and from about 80 wt % to about 95 wt % non-bitumen components (e.g., mineral solids). The first solvent-wet tailings may include no bitumen, especially in the case where additional quantities of first solvent are added to the first solvent-wet tailings as described in greater detail below.

The countercurrent process may include multiple stages. For example, after a first pass of first solvent through the first solvent-wet tailings, the resulting residual bitumen-enriched solvent phase may be passed through the first solvent-wet tailings several more times. Alternatively, additional quantities of fresh first solvent may be passed through the first solvent-wet tailings one or more times. In this manner, the residual bitumen-enriched solvent phase or fresh quantities of first solvent may become progressively more enriched with bitumen after each stage and the first solvent-wet tailings may lose progressively more bitumen after each stage.

The first solvent component of the first solvent-wet tailings may be separated 120 from the first solvent-wet tailings by adding a second solvent to the first solvent-wet tailings. Addition of the second solvent may displace the first solvent component and force the first solvent out of the first solvent-wet tailings. As noted above, the first solvent-wet tailings may include from about 5 wt % to about 20 wt % of the first solvent, and it is desirable to remove this first solvent from the tailings to make the tailings more environmentally friendly.

The second solvent can be any suitable solvent that is useful for displacing the first solvent. In some embodiments the second solvent may have a higher vapor pressure than the first solvent to enhance removal of the second solvent in subsequent processing steps. In some embodiments, the second solvent may be a hydrocarbon solvent. Any suitable hydrocarbon solvent or mixture of hydrocarbon solvents that is capable of displacing the first solvent may be used. The hydrocarbon solvent or mixture of hydrocarbon solvents can be economical and relatively easy to handle and store. The hydrocarbon solvent or mixture of hydrocarbon solvents may also be generally compatible with refinery operations.

In some embodiments, the second hydrocarbon solvent can include one or more volatile hydrocarbon solvents. Volatile hydrocarbon solvents generally include hydrocarbons having a boiling point temperature between about $-20°$ C. and $150°$ C. Volatile hydrocarbon solvents may also include aliphatic compounds that are capable of solvating bitumen and/or the first solvent. Suitable aliphatic compounds can include compounds such as alkanes or alkenes. Any of these aliphatic compounds can be functionalized or non-functionalized. In some embodiments, the second solvent includes one or more aliphatic hydrocarbons having 3 to 9 carbon atoms. In certain embodiments, the second solvent includes aliphatic hydrocarbons having no more than 9 carbon atoms. The second solvent may also include lower carbon paraffins, such as cyclo- and iso-paraffins having 3 to 9 carbon atoms. The second solvent may include one or more of any of the following compounds: methane, ethane, propane, butane, and/or pentane, alkene equivalents of these compounds and/or combinations and derivatives thereof.

In some embodiments, the second solvent may include liquefied petroleum gas (LPG). The term "liquefied petroleum gas" is used broadly herein to refer to any hydrocarbon gas (hydrocarbons that are gases at ambient temperature ($25°$ C.) and pressure (1 atm) and has been compressed to form a liquid. Preferably, the LPG may be primarily or even entirely propane or predominantly or entirely butane. However, other LPG formulations are contemplated including commercially available formulations. The composition of common commercial LPG can vary depending on the time of the year, geographical location, etc. Commercial LPG is a natural derivative of both natural gas and crude oil. Often, LPG is a mixture of propane and butane (n-butane and/or i-butane) with small amounts of propylene and butylene (any one or combination of the four isomers). A powerful odorant such as ethanethiol is typically added to make it easy to detect leaks. Commercial LPG also often contains very small amounts of lighter hydrocarbons, such as ethane and ethylene, and heavier hydrocarbons such as pentane.

Three non-exhaustive examples of commercial LPG are shown below in Table 1

TABLE 1

Examples of Commercially Available LPG

| Component | HD-5 Propane | Commercial Propane | Commercial Butane/Propane Mixture |
|---|---|---|---|
| Lighter Hydrocarbons | Min 90% (liq vol.) propane Max 5% (liq. vol.) propylene | Mixture of propane and/or propylene | Mixture of Butane and/or butylenes and propane and/or propylenes |
| Butane and heavier hydrocarbons | 2.5% (liq. vol.) | 2.5% (liq. vol.) | — |
| Pentane and heavier hydrocarbons | — | — | Max 2% (liq. vol.) |
| Residual matter | 0.05 ml | 0.05 ml | — |
| Total Sulfur | 123 PPMW | 185 PPMW | 140 PPMW |

LPG is stored and transported under pressure to maintain the hydrocarbons as liquids. In some embodiments, LPG may have a boiling point at atmospheric pressure of approximately −80° C. to 10° C., desirably, approximately −55° C. to 5° C., or, suitably, approximately −5° C.

Adding second solvent to the first solvent-wet tailings may be carried out in any suitable manner that results in first solvent displacement from the first solvent-wet tailings. In some embodiments, second solvent may be added to the first solvent-wet tailings in a similar or identical manner to the addition of first solvent to the first solvent-wet tailings described in greater detail above. The amount of the second solvent added to the first solvent-wet tailings may be sufficient to effectively displace at least a portion, or desirably all, of the first solvent in the first solvent-wet tailings. The amount of second solvent added to the first solvent-wet tailings may be approximately 0.5 to 1 times the amount of bitumen by volume originally contained in the material comprising bitumen.

In some embodiments, the addition of second solvent to the first solvent-wet tailings may result in the removal of 95% or more of the first solvent in the first solvent-wet tailings. The first solvent may leave the first solvent-wet tailings as a first solvent-second solvent mixture. The first solvent-second solvent mixture may include from about 5 wt % to about 50 wt % first solvent and from about 50 wt % to about 95 wt % second solvent. The removal of the first solvent from the first solvent-wet tailings through the addition of second solvent may result in a quantity of second solvent not passing all the way through the first solvent-wet tailings. Accordingly, the first solvent-wet tailings may become a second solvent-wet tailings upon separation of the first solvent. In some embodiments, the second solvent-wet tailings may include from about 70 wt % to about 95 wt % non-bitumen components and from about 5 wt % to about 30 wt % second solvent.

As with previously described separation steps, separation of the first solvent from the first solvent-wet tailings by adding second solvent may be preceded or followed by applying pressurized gas over the first solvent-wet tailings. Applying a pressurized gas over the first solvent-wet tailings may facilitate the separation of the first solvent component of the first solvent-wet tailings from the non-bitumen components of the first solvent-wet tailings. The liberated first solvent can then be displaced from the first solvent-wet tailings by applying additional second solvent to the first solvent-wet tailings. The application of a gas overpressure may also displace first solvent from the first solvent-wet tailings by providing a driving force across a filtration element (i.e., the non-bituminous components of the first solvent-wet tailings). Any suitable gas may be used. In some embodiments, the gas is nitrogen, carbon dioxide or steam. The gas may also be added over the second mixture in any suitable amount. In some embodiments, 62.5 ft$^3$ to 375 ft$^3$ of gas per ton of material comprising bitumen may be used. This is equivalent to a range of about 4.5 liters to 27 liters of gas per liter of material comprising bitumen. In certain embodiments, 125 ft$^3$ of gas per ton of material comprising bitumen may be used.

In some embodiments, separating 120 first solvent component of the first solvent-wet tailings may utilize a plate and frame-type filter press to separate the first solvent from the first solvent-wet tailings. The plate and frame-type filter press may be a separate plate and frame-type filter press from the plate and frame-type filter press used to separate the bitumen-enriched solvent phase from the first mixture and/or the first solvent-wet tailings, or the same plate and frame-type filter press may be used to separate the bitumen-enriched solvent phase from the first mixture (or first solvent-wet tailings) and to separate the first solvent from the first solvent-wet tailings. When the same plate and frame-type filter press is used, the method may include adding second solvent to the first solvent-wet tailings still contained in the frame chamber. In other words, the method need not include a step of removing the first solvent-wet tailings (containing mostly solid phases) from the plate and frame-type filter press before mixing with second solvent. The second solvent may be pumped into the plate and frame-type filter press where it displaces the first solvent component of the first solvent-wet tailings located in the frame chambers as it either filters down from the top to the bottom or is pumped upwards from the bottom to the top.

When utilizing a plate and frame-type filter press to separate the first solvent from the first solvent-wet tailings, pressurized gas may be injected into the frame chamber after the frame chamber has been filled with the first solvent-wet tailings. Injecting pressurized gas into the first solvent-wet tailings may promote the separation of the first solvent from mineral solids in the first solvent-wet tailings. The process for adding gas may be similar or identical to the method described above with respect to separation of the bitumen-enriched solvent phase from the first mixture (or first solvent-wet tailings) in a plate and frame-type filter press.

The second solvent may passes through the first solvent-wet tailings loaded in the frame chamber and displaces the first solvent. In some embodiments, 95% or more of the first solvent in the first solvent-wet tailings may be displaced by the second solvent. This first solvent may pass through the filter clothes and out of the frame chamber. Some of the second solvent may also pass through the filter clothes, while some second solvent may remain in the frame chamber. As such, the first solvent-wet tailings may become second solvent-wet tailings.

The separation of first solvent from the first solvent-wet tailings through the addition of second solvent may also be carried out as a countercurrent washing process. The countercurrent process may generally include moving the first solvent-wet tailings in one direction while passing the second solvent through the first solvent-wet tailings in an opposite direction. For example, the first solvent-wet tailings may be loaded at the bottom of a screw classifier conveyor positioned at an incline, while second solvent may be introduced at the top of the inclined screw classifier conveyor. As the screw classifier conveyor moves the first solvent-wet tailings upwardly, the second solvent may flow down the inclined screw classifier conveyor and pass through the first solvent-wet tailings. The two materials may mix and first solvent may be displaced by the second solvent, thereby "washing" the first solvent from the first solvent-wet tailings. In some embodiments, 85% or more of the first solvent in the first solvent-wet tailings may be displaced by the second solvent. The first solvent-second solvent mixture that collects at one end of the screw classifier conveyor may include from about 5 wt % to about 50 wt % first solvent and from about 50 wt % to about 95 wt % second solvent. Some of the second solvent may remain with the tailings, thereby forming the second solvent-wet tailings that collect at the opposite end of the screw classifier conveyor. In some embodiments, the second solvent-wet tailings may include from about 10 wt % to about 30 wt % second solvent and from about 70 wt % to about 90 wt % non-bitumen components.

The countercurrent process may include multiple stages as described in greater detail above with respect to washing the first mixture or first solvent-wet tailings. In a multiple stage countercurrent process, the second solvent may displace progressively more first solvent after each stage and the first solvent-wet tailings lose progressively more first solvent after each stage.

The second solvent may be removed from the second solvent-wet tailings at 130 to thereby produce solvent-dry, stackable tailings. Any manner of removing second solvent from the second solvent-wet tailings may be used. In some embodiments, the second solvent may be removed from the second solvent-wet tailings by drying, flashing or heating the second solvent-wet tailings. In certain embodiments, second solvent may be separated and recovered at an elevated temperature or reduced pressure to above or below atmospheric pressure to recover the secondary solvent depending on the solvent flash point. For example, the process may include flashing off a gaseous second solvent under controlled pressure let down or vacuum recovery of a less volatile secondary solvent without the need for elevated temperature.

Once the second solvent is separated from the second solvent-wet tailings, solvent-dry, stackable tailings may be left behind. Separation of the second solvent from the second solvent-wet tailings may result in 95% or more of the second solvent in the second solvent-wet tailings being removed.

When the second solvent is a volatile hydrocarbon, the energy required to remove the second solvent may be minimal. In some embodiments, the second solvent may be removed from the second solvent-wet tailings at room temperature. The second solvent removed from the second solvent-wet tailings as a vapor may be recompressed or condensed and recycled back in the process.

Removing 130 second solvent from the second solvent-wet tailings may also include separation of any residual amount of first solvent that has remained in the second solvent-wet tailings despite separation 120. Separation of the first solvent may occur together with the separation of the second solvent, such as by heating or flashing the second-solvent wet tailings in a manner causing both solvents to evaporate from the second-solvent wet tailings. Alternatively, the separation may be incremental, wherein the flashing or heating is carried out to start with at conditions that will cause only the second solvent to evaporate, followed by adjusting the conditions to cause the evaporation of the first solvents. Any solvent removed from the second solvent-wet tailings may be recovered for further use, such as by sending the evaporated solvents to stills.

The solvent-dry, stackable tailings resulting from removal of the second solvent from the second solvent-wet tailings may generally include inorganic solids, such as sand and clay, water, and little to no first and second solvent. As used herein, the term "solvent-dry" means containing less than 0.1 wt % total solvent. As used herein, the term "stackable" means having a water content of from about 2 wt % to about 15 wt %. This range of water content may create a damp tailings that will not produce dust when transporting or depositing the tailings. This range of water content may also provide a stackable tailings that will not flow like dry sand, and therefore has the ability to be retained within an area without the need for retaining structures (e.g., a tailings pond). This range of water content may also provide tailings that are not so wet as to be sludge-like or liquid-like. The solvent-dry, stackable tailings produced by the above described method may also include less than 2 wt % bitumen and asphaltene.

Figure 2:
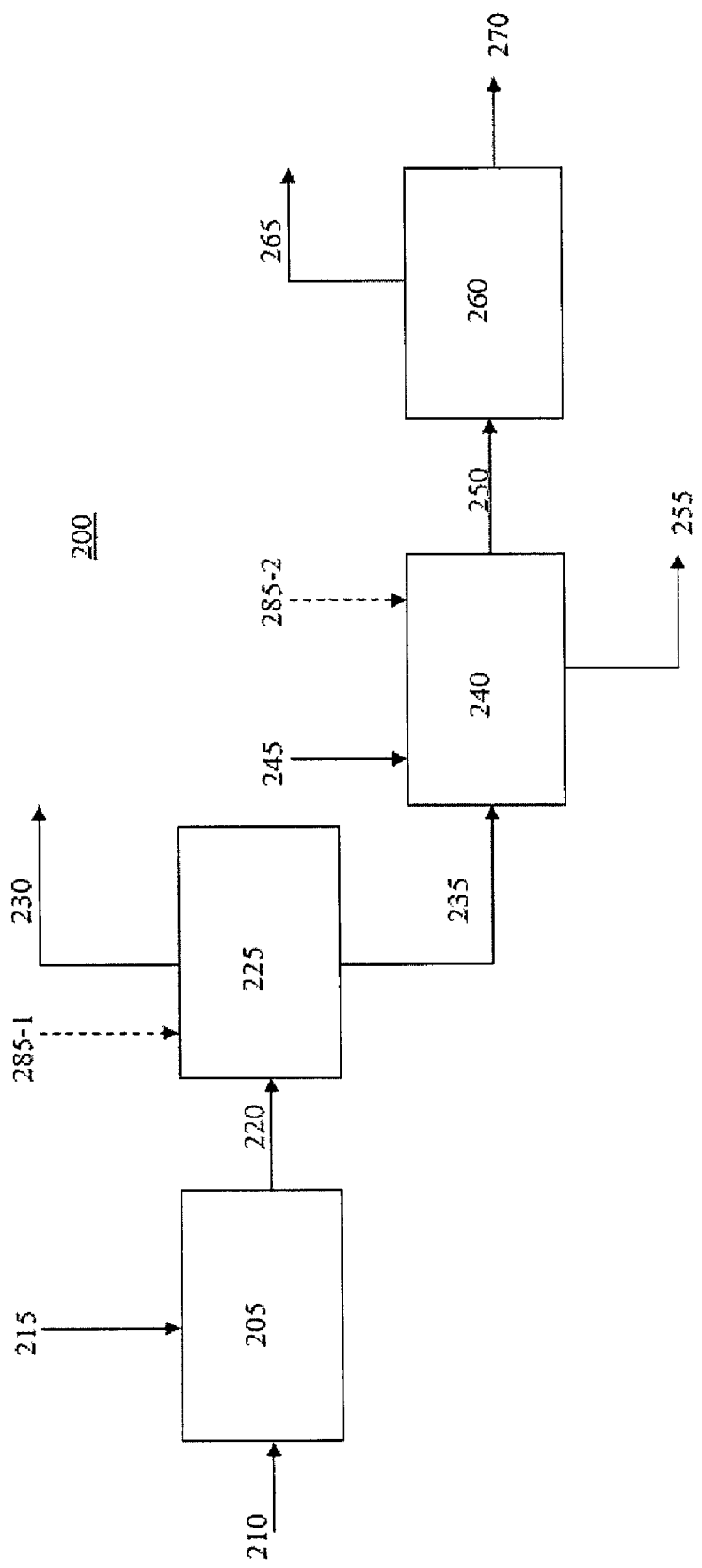
FIG. 2 is a schematic diagram for a system and method for producing solvent-dry, stackable tailings as disclosed herein.

With reference to FIG. 2, a system 200 for carrying out the above-described method. may include a mixer 205 for mixing material comprising bitumen 210 and first solvent 215. Any suitable mixing vessel may be used, including a mixing vessel that operates under pressure in order to maintain the first solvent as a liquid. A first mixture 220 is formed by the mixing of the material comprising bitumen 210 and the first solvent 215 in the mixer 205. The first mixture 220 is transported to a first separation unit 225 where a bitumen-enriched solvent phase 230 is separated from the first mixture 220. Any separation unit suitable for separating the bitumen-enriched solvent phase 230 from the first mixture 220. In some embodiments, first separation unit 225 is a plate and frame filter press. Gas 285-1 may be pumped into the first separation unit 225 to promote separation of bitumen from the non-bitumen components of the material comprising bitumen. When gas 285-1 is pumped into first separation unit 225, the spent gas may also exit the first separation unit 225 with the bitumen-enriched solvent phase 230. Because the gas does not dissolve in either the bitumen or the first solvent of the first mixture 220, the gas exits with the bitumen-enriched solvent phase and does not require any additional separation processing. Removal of the bitumen-enriched solvent phase 230 from the first mixture 220 via first separation unit 225 results in the first mixture 220 becoming first solvent-wet tailings 235. The first solvent-wet tailings 235 produced by the first separation unit 225 are transported to a second separation unit 240 where second solvent 245 is added to the first solvent-wet tailings 235 in order to separate first solvent 255 from the first solvent-wet tailings 235. Any separation unit suitable for separating the first solvent 255 from the first solvent wet tailings 235 may be used. In some embodiments, second separation unit 240 is a plate and frame filter press. Gas 285-2 may be pumped into the second separation unit 240 to promote separation of the first solvent 255 from the non-bitumen components of the first solvent-wet tailings 235. When gas 285-2 is pumped into second separation unit 240, the spent gas may also exit the second separation unit 240 with the first solvent 255. Because the gas does not dissolve in the first solvent 255, the gas exits without need for any additional separation processing. Separation of the first solvent 255 from the first solvent-wet tailings 235 results in the first solvent-wet tailings 235 becoming second solvent-wet tailings 250. The second solvent-wet tailings 250 are transported to a third separation unit 260 where the second solvent is removed from the second solvent-wet tailings 250 phase to thereby form solvent-dry, stackable tailings 270. In this regard, the third separation unit 260 produces solvent-dry, stackable tailings 270 and a removed second solvent stream 265. The third separation unit 260 may be any suitable unit capable of removing second solvent 265 from the second solvent-wet tailings 250. For example, the third separation unit 260 may be a dryer, a heater or a flashing unit to evaporate the second solvent from the second solvent-wet tailings 250.

Figure 3:
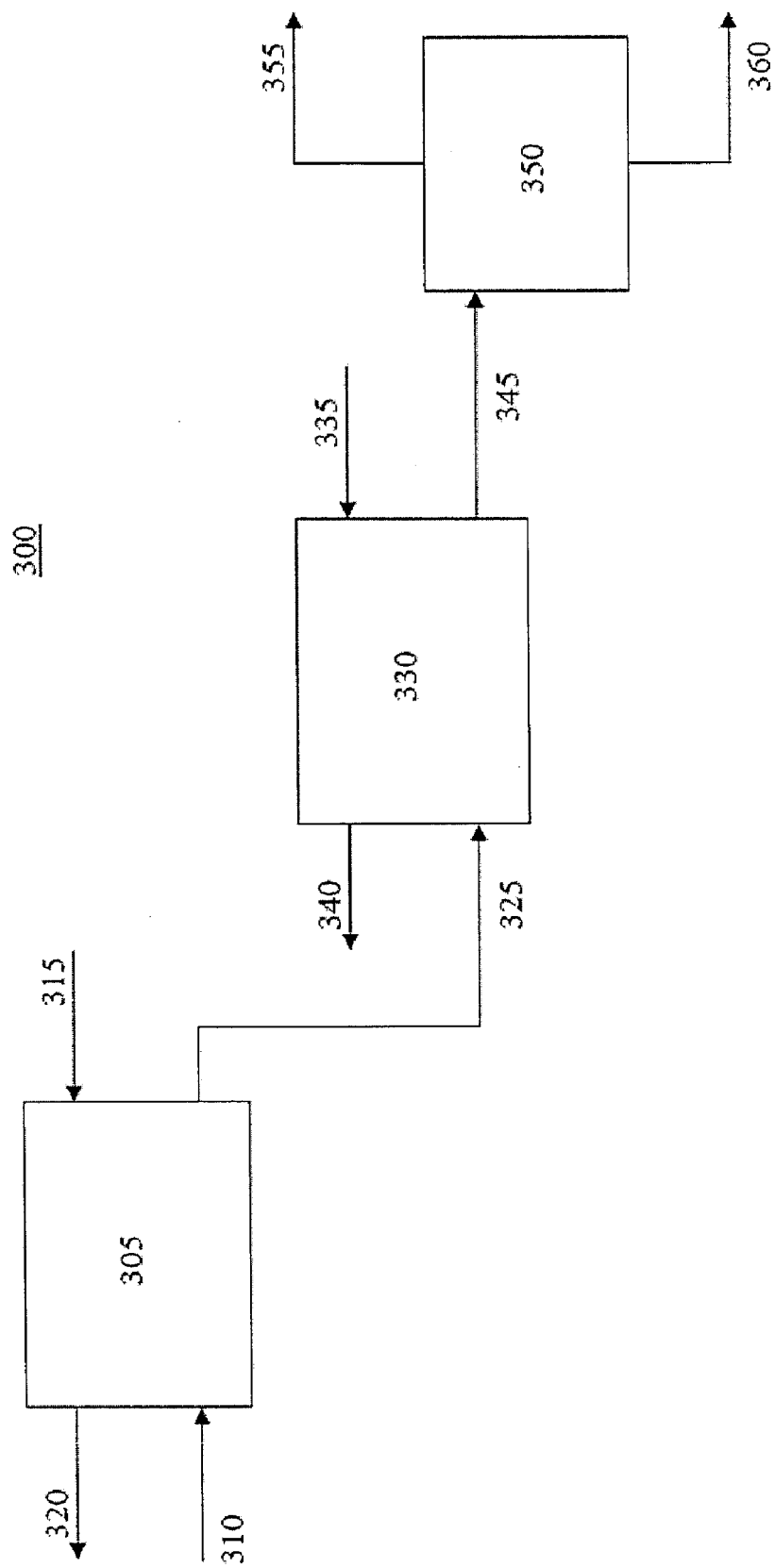
FIG. 3 is a schematic diagram for a system and method for producing solvent-dry, stackable tailings as disclosed herein.

With reference to FIG. 3, a variation of the system used to carry out the method of the above embodiment includes the use of countercurrent. Pre-mixture 310 includes material comprising bitumen mixed with first solvent to cause bitumen to dissolve in the first solvent. Washing unit 305 receives the pre-mixture 310 moving in a first direction and first solvent 315 moving in an opposite direction. The material comprising bitumen 310 mixes with the first solvent 315, during which the dissolved bitumen in the pre-mixture 310 is displaced from the pre-mixture 310 by the first solvent 315. As such, a bitumen-enriched solvent phase 320 and a first solvent-wet tailings 325 are formed. The bitumen-enriched solvent phase 320 and the first solvent-wet tailings 325 separate due to the countercurrent configuration of the washing unit 305. First solvent-wet tailings 325 are transported to a second washing unit 330 where it flows in a direction opposite to a direction of flow of second solvent 335 introduced into the second washing unit 330. The first solvent-wet tailings 325 mix with the second solvent 335, during which the first solvent in the first solvent-wet tailings 325 is displaced by the second solvent 335. As such, first solvent-second solvent mixture 340 and second solvent-wet tailings 345 are formed. The first solvent-second solvent mixture 340 and the second solvent-wet tailings 345 separate due to the countercurrent configuration of the second washing unit 330. Second solvent-wet tailings 345 are transported to first separation unit 350 where second solvent 355 is removed from the second solvent-wet tailings 345 to produce solvent-dry, stackable tailings 360. First separation unit 350 may be any suitable separation unit for removing second solvent 355, such as a heating unit or a flashing unit.

In certain embodiments, a method for producing solvent-dry, stackable tailings may include loading a mixture of material comprising bitumen and first solvent in a vertical column and treating the mixture by injecting solvents at the top of the vertical column. Additional first solvent may be injected at the top of the vertical column to extract bitumen from the material comprising bitumen as the first solvent travels through the material comprising bitumen. Second solvent may also be injected at the top of the vertical column to remove first solvent from the material loaded in the vertical column. Such treatment results in production of solvent-dry, stackable tailings in the vertical column.

Figure 4:
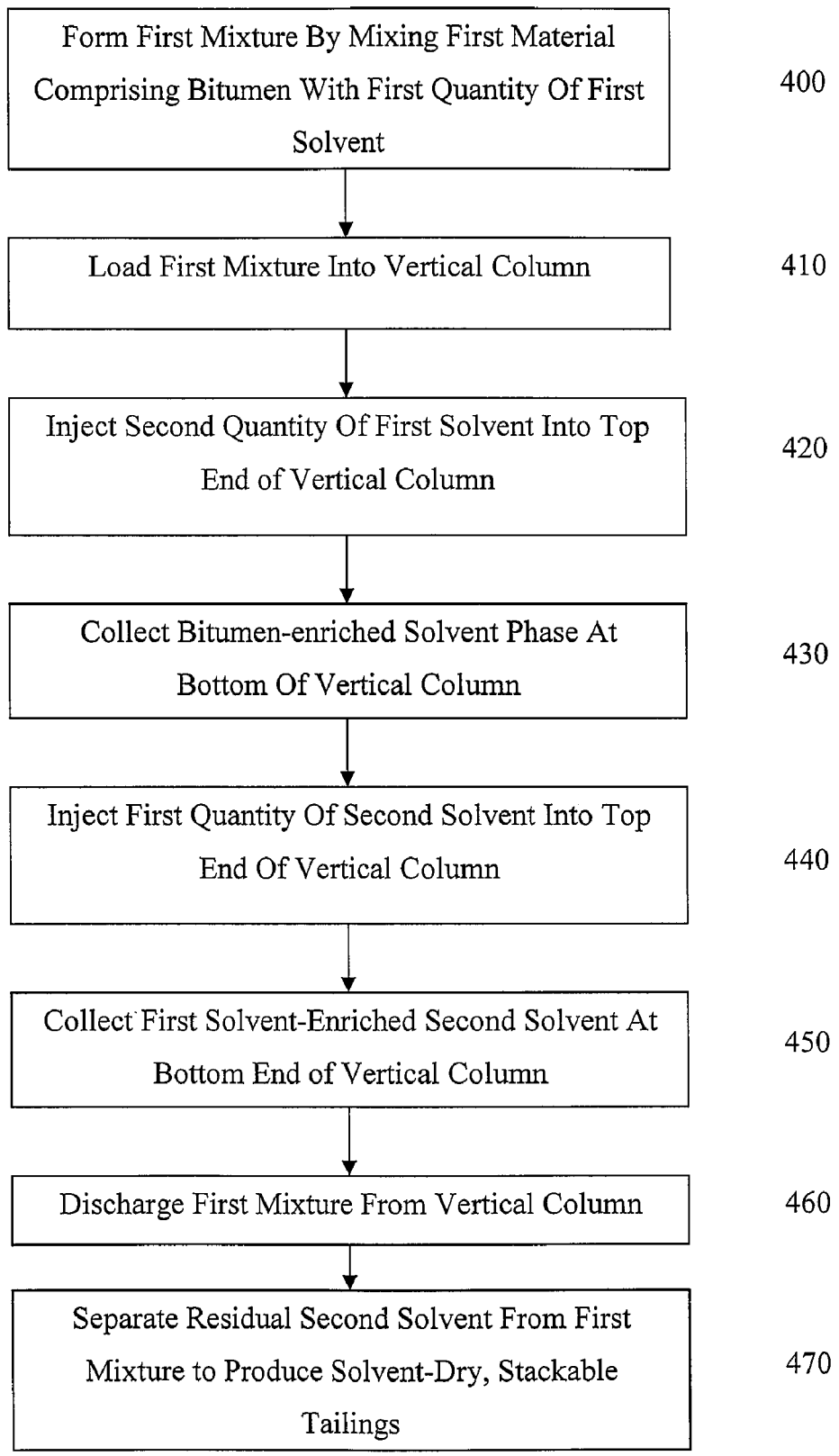
FIG. 4 is a flow chart detailing a method for producing solvent-dry, stackable tailings as disclosed herein.

With reference to FIG. 4 the method according to this embodiment may include forming 400 a first mixture by mixing material comprising bitumen with a first quantity of first solvent. Forming 400 first mixture may be similar or identical to the mixing process 100 described in greater detail above. Any mixing processes may be used to mix the material comprising bitumen with the first quantity of first solvent. The material comprising bitumen may be mixed with the first solvent in the same ratios as set forth above. In some embodiments, the aim of mixing at 400 is to create a first mixture that has a suitable viscosity for pumping the first mixture. If too much first solvent is added to the material comprising bitumen, then it may not be possible to pump the first mixture because all of the non-bitumen components of the first mixture will settle out. If too little first solvent is added to the material comprising bitumen, then it may not be possible to pump the first mixture because it is too viscous. Accordingly, the amount of first solvent added to the material comprising bitumen when forming the first mixture may be an amount that results in the first mixture having a viscosity in the range of from 2 to 50 centipoise.

In certain embodiments, the amount of first solvent added when forming 400 the mixture is from about 0.5 to about 1.25, and preferably 0.75 times the amount of bitumen by volume in the original material comprising bitumen.

As with mixing 100, the material comprising bitumen used in when forming 400 the mixture may be any material having 3 wt % or more bitumen content and the first solvent may generally be a light aromatic solvent capable of dissolving the bitumen in the material comprising bitumen. By mixing the first quantity of first solvent with the material comprising bitumen, the first quantity of first solvent may begin to dissolve the bitumen in the material comprising bitumen. As such, the first mixture may begins to form two phases. The first phase may be the bitumen-enriched solvent phase and the second phase may be the first solvent-wet tailings. 50% or more of the bitumen in the material comprising bitumen may be dissolved upon the addition of the first quantity of first solvent to the material comprising bitumen.

The first mixture may be loaded 410 in a vertical column. Any method of loading the first mixture in the vertical column may be used. First mixture may be poured into the vertical column or, when an appropriate first mixture viscosity is obtained from mixing 400, the first mixture may be pumped into the vertical column. First mixture may generally be loaded in the vertical column by introducing the first mixture into the column at the top end of the vertical column. The bottom end of the vertical column may be blocked, such as by a removable plug or by virtue of the bottom end of the vertical column resting against the floor. In some embodiments, a metal filter screen at the bottom end of the vertical column may be used to maintain the first mixture in the vertical column. Accordingly, introducing first mixture at the top end of the vertical column may fill the vertical column with first mixture. The amount of first mixture loaded in the vertical column may be such that the first mixture substantially fills the vertical column with first mixture. In some embodiments, first mixture may be added to the vertical column to occupy 90% or more of the volume of the vertical column. In some embodiments, the first mixture may not be filled to the top of the vertical column so that room is provided to inject first solvent, second solvent, etc., into the vertical column.

As noted above, the column may have a generally vertical orientation. The vertical orientation may include aligning the column substantially perpendicular to the ground, but also may include orientations where the column forms angles less than 90° with the ground. The column may generally be oriented at any angle that results in gravity aiding the flow of the first solvent, second solvent, etc., from one end of the column to the other. In some embodiments, the column may be oriented at an angle anywhere within the range of from about 1° to 90° with the ground. In a preferred embodiment, the column may be oriented at an angle anywhere within the range of from about 15° to 90° with the ground.

The material of the vertical column is also not limited. Any material that will hold the first mixture within the vertical column may be used. The material may also preferably be a non-porous material such that various liquids injected into the vertical column may only exit the column from one of the ends of the vertical column. The material may be a corrosive resistant material so as to withstand the potentially corrosive components of the first mixture loaded in the column as well as any potentially corrosive materials injected into the vertical column.

The shape of the vertical column is not limited to a specific configuration. Generally speaking, the vertical column may have two ends opposite one another, designated a top end and a bottom end. The cross-section of the vertical column may be any shape, such as a circle, oval, square or the like. The cross-section of the vertical column may change along the height of the column, including both the shape and size of the vertical column cross-section. The vertical column may be a straight line vertical column having no bends or curves along the height of the vertical column. Alternatively, the vertical column may include one or more bends or curves.

Any dimensions may be used for the vertical column, including the height, inner cross sectional diameter and outer cross sectional diameter of the vertical column. In some embodiments, the ratio of height to inner cross sectional diameter may range from 0.5:1 to 15:1.

Once first mixture is loaded in the vertical column, a second quantity of first solvent may be injected 420 into the vertical column. The second quantity of first solvent may be injected into the vertical column at the top end of the column such that the second quantity of first solvent flows down and through the first mixture loaded in the column. The second quantity of first solvent may be injected into the vertical column by any suitable method. In some embodiments, the second quantity of first solvent may be poured into the vertical column at the top end and allowed to flow down through the first mixture loaded therein under the influence of gravity.

The amount of first solvent added 420 to the first mixture is not limited. The amount may preferably be enough first solvent to displace most or all of the dissolved bitumen content of the first mixture. In some embodiments, the amount of first solvent added at 420 may be from about 1.25 to about 2.25 times the amount of bitumen by volume in the original material comprising bitumen.

In some embodiments, the addition 420 of second quantity of first solvent may be carried out under flooded conditions. In other words, more first solvent may be added to the top of the vertical column than what flows down through the first mixture, thereby creating a head of solvent at the top of the vertical column.

Upon injection into the first mixture, the first solvent may flow downwardly through the height of the column via small void spaces in the first mixture. The first solvent may flow downwardly through the force of gravity or by an external force applied to the vertical column. Examples of external forces applied include the application of pressure from the top of the vertical column or the application of suction at the bottom of the vertical column. The first solvent may travel the flow of least resistance through the first mixture. As the first solvent flows downwardly through the first mixture, bitumen contained in the first mixture may be dissolved in the first solvent. In this manner, the first solvent flowing through the first mixture may become bitumen enriched. The first solvent injected into the first mixture may also join together with the first solvent component of the first mixture. Bitumen may already be dissolved in the first solvent component of the first mixture, and thus when the second quantity of injected first solvent joins with the first solvent component of the first mixture, the combined first solvents are bitumen enriched.

The bitumen-enriched solvent that has flowed downwardly through the height of the vertical column may exit the vertical column, where it may be collected 430 for further use and processing. In some embodiments, the bitumen-enriched solvent may include from about 10 wt % to about 60 wt % bitumen and from about 40 wt % to about 90 wt % first solvent. Minor amounts of non-bitumen material may also be included in the bitumen-enriched solvent phase. In some embodiments, 95% or more of the bitumen may be removed from the first mixture upon completion of collecting 430 bitumen-enriched solvent.

Any method of collecting the bitumen-enriched solvent may be used, such as by providing a collection vessel at the bottom end of the vertical column. The bottom end of the vertical column may include a metal filter screen having a mesh size that does not permit first mixture to pass through but which does allow for bitumen-enriched solvent to pass through and collect in a collection vessel located under the screen. Collection of bitumen-enriched solvent may be carried out for any suitable period of time. In some embodiments, collection is carried out for 2 to 30 minutes.

420 and 430 may be repeated several times. In other words, after injecting a second quantity of first solvent and collecting the bitumen-enriched solvent at the bottom of the vertical column, a third quantity of first solvent may be added to the vertical column to extract additional bitumen from the first mixture. Repeating 420 and 430 may increase the overall extraction rate of bitumen from the first mixture. In some embodiments, the use of multiple first solvent injection steps may result in removing 99% or more of the bitumen in the first mixture.

After collection of bitumen-enriched solvent has been completed or while bitumen-enriched solvent is still being collected, a first quantity of second solvent may be injected 440 into the column. Second solvent may be similar or identical to the second solvent described in greater detail in the previous embodiment. In some embodiments, the second solvent may be a volatile hydrocarbon solvent.

The first quantity of second solvent may be injected into the column at the top end of the column such that the first quantity of second solvent flows down and through the first mixture loaded in the column. The first quantity of second solvent may be injected into the vertical column by any suitable method. In some embodiments, the first quantity of second solvent may be poured into the vertical column at the top end and allowed to flow down through the first mixture loaded therein.

The amount of second solvent added 440 to the first mixture is not limited. The amount may preferably be enough second solvent to displace most or all of the first solvent contained in the first mixture. In some embodiments, the first quantity of second solvent added to the first mixture may be from about 0.5 to about 2.0, and preferably about 1 times the amount of bitumen by volume contained in the original material comprising bitumen. If multiple second solvent addition steps are performed, then the total amount of second solvent added may be about 1.0 times the amount of bitumen by volume contained in the original material comprising bitumen.

Upon injection into the first mixture, the second solvent may flow downwardly through the height of the column via void spaces in the first mixture. The second solvent may flow down the height of the vertical column under the force of gravity or by an external force applied to the vertical column, such as pressure at the top end of the vertical column or suction at the bottom end of the vertical column. The second solvent may travel the flow of least resistance through the first mixture. As the second solvent flows downwardly through the first mixture, first solvent in the first mixture may be dissolved in the second solvent. In this manner, the second solvent may become first solvent-enriched.

The first solvent-enriched second solvent that has flowed downwardly through the height of the column may exit the column where it may be collected 450 for further use and processing. In some embodiments, the first solvent-enriched second solvent may include from about 50 wt % to about 90 wt % second solvent and from about 10 wt % to about 50 wt % first solvent. Minor amounts of bitumen and non-bitumen material may also be included in the first solvent-enriched second solvent phase. In some embodiments, 95% of the first solvent may be removed from the first mixture upon completion of collecting 450 the first solvent-enriched second solvent.

In some embodiments, the addition 440 of second solvent may be carried out under flooded conditions. In other words, more second solvent may be added to the top of the vertical column than what flows down through the first mixture, thereby creating a head of solvent at the top of the vertical column.

Any method of collecting 450 the first solvent-enriched second solvent may be used, such as by providing a collection vessel at the bottom end of the vertical column. The bottom end of the vertical column may include a metal filter screen having a mesh size that does not permit first mixture to pass through but which does allow for first solvent-enriched second solvent to pass through and collect in a collection vessel located under the screen. Collection of first solvent-enriched second solvent may be carried out for any suitable period of time. In some embodiments, collection may be carried out for 2 to 30 minutes.

440 and 450 may be repeated one or more times. In other words, after injecting a first quantity of second solvent and collecting the first solvent-enriched second solvent at the bottom of the vertical column, a second quantity of second solvent may be added to the vertical column to extract additional first solvent from the first mixture. Repeating 440 and 450 may increase the overall removal rate of first solvent from the first mixture. In some embodiments, the use of multiple second solvent injection steps may result in removing 99% or more of the first solvent in the first mixture.

The first mixture is discharged 460 from the column. The first mixture may be removed from the vertical column by any suitable process. The first mixture loaded in the vertical column may be removed from either the top end or the bottom end of the vertical column. In some embodiments, the bottom end of the vertical column may be covered with a removable plug, and the plug may be removed to allow the first mixture loaded in the vertical column to discharge out of the vertical column by the force of gravity. For example, if the bottom end of the vertical column is blocked by a screen as described in greater detail above, the screen may be removed to allow the first mixture loaded in the vertical column to flow out of the vertical column. In certain embodiments, the vertical column may be lifted off of the ground, thereby allowing the first mixture loaded in the vertical column to flow out of the bottom end of the vertical column. External forces may also be applied to the vertical column to promote the discharging of the first mixture from the vertical column.

The discharged first mixture may generally include non-bitumen components of the material comprising bitumen (e.g., mineral solids) and a relatively small amount of second solvent. In some embodiments, the discharged first mixture may be from about 80 wt % to about 95 wt % non-bitumen components and from about 5 wt % to about 20 wt % second solvent. The discharged first mixture may include little or no first solvent and little or no bitumen.

The residual second solvent in the discharged first mixture may be removed 470 from the discharged first mixture to produce solvent-dry, stackable tailings. Any suitable procedure may be used to remove the residual second solvent from the discharged first mixture. In some embodiments, the discharged first mixture may be flashed or dried in order to remove the second solvent. The removal of second solvent may include recovering the second solvent for reuse in the above method. Such recovery may include condensing the evaporated second solvent back into a liquid form.

In one variation to discharging, the removal of the residual second solvent may be performed prior to discharging the first mixture from the vertical column. Such removal may be carried out by any suitable process for removing second solvent from first mixture loaded in the vertical column. In some embodiments, heated gas may be injected into the first mixture in order to remove the residual second solvent. Heated gas may be injected into the first mixture by any suitable process. In some embodiments, the gas may be added to a freeboard on top of the first mixture loaded in the column. In certain embodiments, one or more gas injection lines may run down through the first mixture loaded in the vertical column. These lines may be placed down the center of the vertical column, along the sides of the vertical column, or a combination of both. In certain embodiments, a double walled vertical column may be provided, with the internal wall being porous. Gas may be pumped into the space between the two walls. The gas may then travel into the first mixture loaded in the inner most cylinder of the vertical column by traveling through the porous inner wall.

Any suitable gas may be used for this removal step, such as nitrogen, carbon dioxide or steam. The gas may generally be heated to a temperature above the boiling point temperature of the second solvent in order to result in the removal of the second solvent from the first mixture. The amount of gas added to the first mixture is not limited. In some embodiments, 3.5 $m^3$ of heated gas may be added per 20 kg of first mixture. The gas injected into the first mixture loaded in the vertical column and the evaporated second solvent may exit the vertical column at the bottom end of the vertical column. For example, where the bottom end of the vertical column includes a metal filter screen, the gases may pass through the filter screen. Gas exiting the vertical column may be collected and reused within the process.

Once the second solvent is removed, a solvent-dry, stackable tailings may be produced. The majority of the bitumen in the first mixture may be removed via the first solvent, the majority of the first solvent in the first mixture may be removed via the second solvent, and the majority of the second solvent in the first mixture may be removed via a process such as flashing or drying, thereby resulting in the formation of solvent-dry, stackable tailings. The solvent-dry, stackable tailings may generally include inorganic solids, such as sand and clay, water content, and little or no solvent. In some embodiments, the solvent-dry, stackable tailings may be considered solvent-dry because they include less than 0.1 wt % total solvent. Similarly, the solvent-dry, stackable tailings may be considered stackable because they include a water content in the range of from 2 wt % to 15 wt %. This range of water content may reduce or eliminate the problem of tailings dust during transportation and deposition of the tailings. Further, this range or water content may provide for solvent-dry, stackable tailings that may be deposited without requiring retention infrastructure to maintain the tailings in place. The solvent-dry, stackable tailings may include less than 2 wt % bitumen and asphaltene.

Additional steps may be included in the method of this embodiment to further accomplish the production of solvent-dry, stackable tailings. In one example, the method may further include one or more gas purge steps. Gas purge steps may be performed before or after any of the solvent injection steps. The gas purge steps may help to separate dissolved bitumen and/or first solvent from the non-bitumen components of first mixture. Once dissolved bitumen is separated from non-bitumen components via the gas purge, the dissolved bitumen may be more readily displaced by the first solvent. Similarly, once first solvent is separated from non-bitumen components via the gas purge, the first solvent may be more readily displaced by the second solvent.

The gas may be injected into the vertical column in any suitable manner. In some embodiments, the gas may be added to a freeboard on top of the first mixture loaded in the column. In certain embodiments, one or more gas injection lines may run down through the first mixture loaded in the vertical column. These lines may be placed down the center of the vertical column, along the sides of the vertical column, or a combination of both. In certain embodiments, a double walled vertical column may be provided, with the internal wall being porous. Gas may be pumped into the space between the two walls. The gas may then travel into the first mixture loaded in the inner most cylinder of the vertical column by traveling through the porous inner wall.

Any amount of gas may be injected into the first mixture to remove dissolved bitumen. In some embodiments, between 50 and 200 ft$^3$ of gas per ton of material comprising bitumen feed may be used. The gas used in the gas purges is not limited. In some embodiments, the gas may be an inert gas. For example, the gas may be nitrogen, carbon dioxide, or steam.

Another step may include injecting cooled gas into the vertical column to purge the vertical column. Cooled gas may be added to remove the gaseous second solvent present in interstitial spaces of the tailings after a heated gas has been injected to vaporize second solvent. Any suitable gas may be used. In some embodiments, the gas is nitrogen or carbon dioxide.

Figure 5:
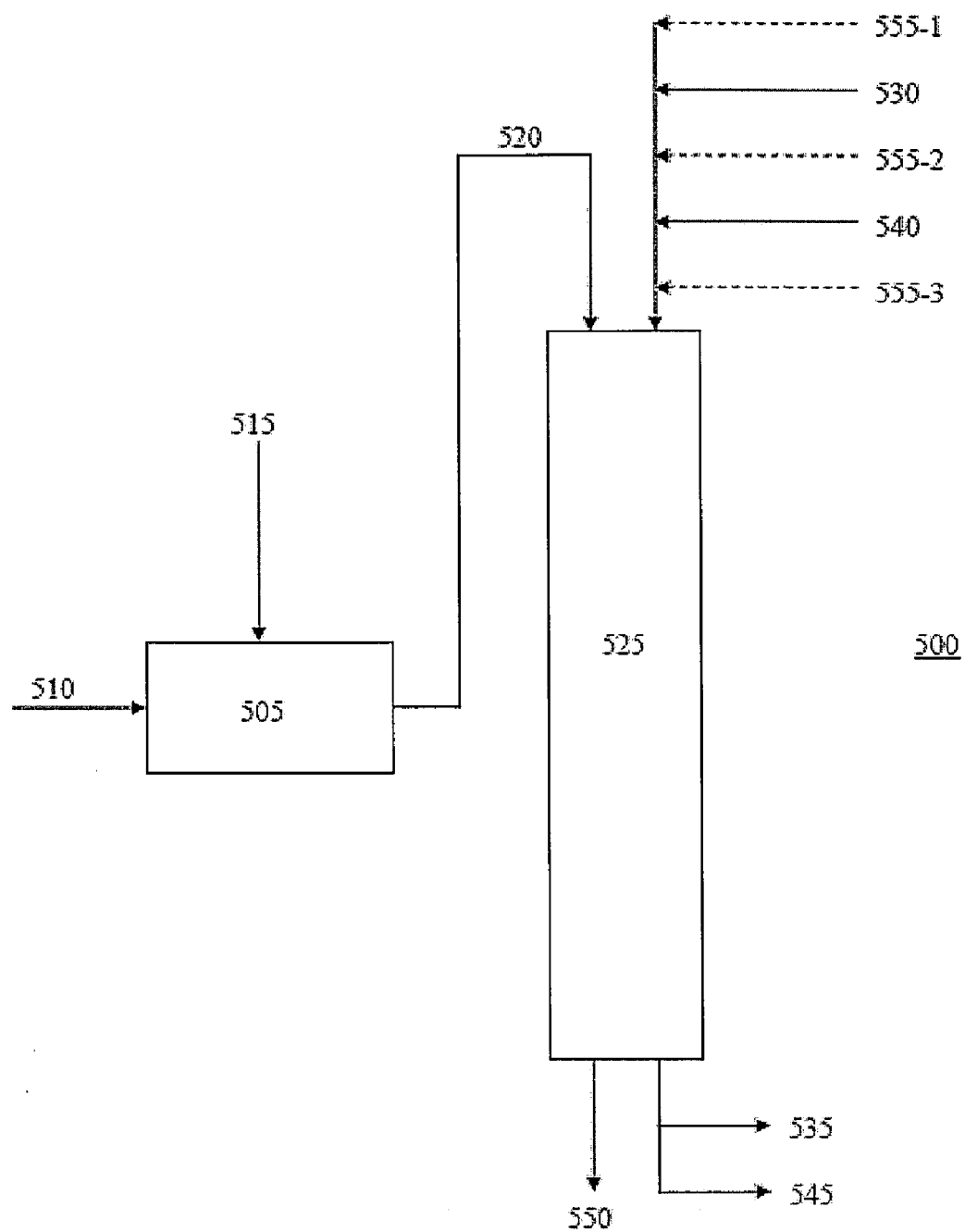
FIG. 5 is a schematic diagram for a system and method for producing solvent-dry, stackable tailings as disclosed herein.

With reference to FIG. 5, a system that may be used to carry out the method of this embodiment may include a mixing vessel 505 for mixing material comprising bitumen 510 with a first quantity of first solvent 515 to form a first mixture 520. Any type of mixing vessel may be used to mix the material comprising bitumen 510 and the first solvent 515.

The first mixture 520 is then loaded in the vertical column 525. FIG. 5 depicts the first mixture 520 being loaded in the top end of the vertical column 525, but the first mixture 520 can also be loaded from the bottom end of the vertical column 525 or from the side of the vertical column 525. Once the first mixture 520 is loaded in the vertical column 525, a second quantity of first solvent 530 is injected into the top end of the vertical column. The second quantity of first solvent 530 flows down the height of the vertical column 525, dissolving solid bitumen in the first mixture 520 and/or displacing dissolved bitumen in the first mixture 520 along the way. The non-bitumen components of the material comprising bitumen remain in a packed condition in the vertical column 525 as the second quantity of first solvent 530 passes through the first mixture 520. The second quantity of first solvent 530 exits the bottom end of the vertical column 525 as a bitumen-enriched solvent phase 535. The second quantity of first solvent 530 is now a bitumen-enriched solvent phase 535 because the second quantity of first solvent 530 dissolves solid bitumen contained in the first mixture 520 and/or coalesces with dissolved bitumen contained in the first mixture 520 as the second quantity of first solvent 530 passed through the vertical column 525.

The bitumen-enriched solvent phase 535 is collected at the bottom end of the vertical column 525 for further processing of the bitumen contained therein. Some of the second quantity of first solvent 530 remains in the first mixture 520 loaded in the vertical column 525. A first quantity of second solvent 540 is then added to the vertical column 525. The first quantity of second solvent 540 flows down the height of the vertical column 525, dissolving and/or displacing first solvent contained in the first mixture 520. The first quantity of second solvent 540 exits the bottom end of the vertical column 525 as a first solvent-enriched second solvent phase 545.

The first solvent-enriched second solvent phase 545 is collected at the bottom end of the vertical column 525 to recover and possibly reuse the first and second solvents contained therein. Optionally, the system also includes a series of gas purge injections 555-1, 555-2, and 555-3. The gas purge injections 555-1, 555-2, and 555-3 may occur before and/or after any of the solvent injection steps, and may serve to help separate bitumen and first solvent from the non-bitumen component of the first mixture 520. While not depicted in FIG. 5, still other gas streams may be injected into the vertical column 525. For example, a hot gas stream may be injected into the vertical column after the first quantity of second solvent 540 has been added to the first mixture 520 in order to vaporize any second solvent that does not exit the vertical column 525 at the bottom end of the vertical column 525.

Once all of the solvent and gas streams have been injected, the first mixture 520 becomes solvent-dry, stackable tailings 550 which are discharged out of the vertical column 525. FIG. 5 depicts solvent-dry, stackable tailings 550 being removed from the bottom end of the vertical column 525, but the solvent-dry, stackable tailings 550 may also be discharged from the top end of the vertical column 525.

Figure 6:
FIG. 6 is a photograph of solvent-dry, stackable tailings produced by the methods and systems described herein.

FIG. 6 is a photograph of solvent-dry, stackable tailings derived from processing about 600 kg of Athabasca oil sands containing about 12.5 wt % bitumen in a system as illustrated in FIG. 5. The solvent-dry, stackable tailings shown contain less than 0.1 wt % bitumen.

In both embodiments described above, the method can include a further step of depositing the solvent-dry, stackable tailings in a mine pit formed when mining the first material comprising bitumen. The manner in which the solvent-dry, stackable tailings are deposited in the mine pit is not limited. In one example, the solvent-dry, stackable tailings may be transported to the mine pit by one or more trucks and poured into the mine pit from the trucks. Solvent-dry, stackable tailings may also be deposited in a mine pit through the use of conveyor belts that empty into the mine pits. In some embodiments, the volume of solvent-dry, stackable tailings produced from the mined material comprising bitumen may be less than the original amount of material comprising bitumen mined such that the entirety of the solvent-dry, stackable tailings may be deposited in the mine pit. To the contrary, conventional hot water processing of material comprising bitumen may generally produce wet tailings having a volume that is 125% of the original volume of the mined material comprising bitumen, even after settling and decanting of excess liquid. Additionally, the presence of some amount of water in the solvent-dry, stackable tailings may aid in the compaction of the solvent-dry, stackable tailings. This may lead to a much earlier trafficable reclamation for the deposit, an aspect of tailings management which has not been attained by tar sands operators to date.

As described in greater detail in co-pending U.S. application Ser. Nos. 12/041,554 and 11/249,234, further processing may be performed on other components produced by the methods described above. For example, the bitumen-enriched solvent phase may be processed to separate the bitumen therefrom. Furthermore, as described in co-pending application Ser. No. 12/509,298, herein incorporated by reference, any bitumen obtained from the above-described methods or from further processing of the bitumen-enriched solvent phases produced by the above-described processes may be cracked in a nozzle reactor (with or without deasphalting) to produce light hydrocarbon distillate. The light hydrocarbon distillate may then be used as a first solvent to extract bitumen from material comprising bitumen. In one example, the light hydrocarbon distillate produced may be recycled within the same process to initiate extraction of bitumen from further material comprising bitumen. Additionally, any solvent separated or removed from a mixture may be recovered and reused in the process. For example, the first solvent-enriched second solvent phase may be recovered after being separated from the second solvent-wet tailings and reused in the process. More specifically, the first solvent-enriched second solvent phase is separated into first and second solvent that may be used in the process. Separation of the solvents may be accomplished by any know method, such as through the use of stills.

Any bitumen recovered from the above-described methods, such as the bitumen content of the bitumen-enriched solvent phases, may also undergo any type of upgrading processing known to those of ordinary skill in the art. Upgrading of the bitumen may comprise any processing that generally produces a stable liquid (i.e., synthetic crude oil) and any subsequent refinement of synthetic crude oil into petroleum products. The process of upgrading bitumen to synthetic crude oil may include any processes known to those of ordinary skill in the art, such as heating or cracking the bitumen to produce synthetic crude. The process of refining synthetic crude may also include any processes known to those of ordinary skill in the art, such as distillation, hydrocracking, hydrotreating and coking. They petroleum products produced by the upgrading process are not limited, any may include petroleum, diesel fuel, asphalt base, heating oil, kerosene, and liquefied petroleum gas.

EXAMPLES

Example 1

Semi-Continuous Countercurrent Washing Using a Plate and Frame Horizontal Filter Press A first bitumen extraction experiment was conducted using a plate and frame filter press. 200.0 kg of oil sand ore having a bitumen content of 12 wt % was mixed with a primary solvent of Solvesso 150. The primary solvent to bitumen ratio was about 1:1. The primary solvent and oil sand ore was mixed for 15 minutes in a disaggregation device.

The ore/solvent mixture was removed from the disaggregation device and pumped to the plate and frame filter press. The plate and frame filter press was filled through a fill orifice until pressure reached a maximum. The plate and frame filter was pressurized with an inert gas and the bitumen-enriched solvent phase collected at the outlet of the plate and frame filter press. The bitumen-enriched solvent phase weighed 29.0 kg, including 14.0 kg of bitumen and 15.0 kg of primary solvent. First solvent-wet tailings remained in the filter press.

A fresh solution of primary solvent was pumped into the plate and frame filter press at a solvent to original bitumen weight ratio of 0.75:1. The plate and frame filter press was pressurized with inert atmosphere and the fresh primary solvent was forced through the first solvent-wet tailings in a plug flow 'washing' action. The secondary bitumen-enriched solvent phase was collected at the outlet of the plate and frame filter press. The secondary bitumen-enriched solvent phase weighed 24.5 kg, including 6.5 kg of bitumen and 18.0 kg of primary solvent. The first solvent-wet tailings remained in the plate and frame filter press.

The first solvent-wet tailings remaining in the plate and frame filter press were cleaned of residual primary solvent and any remaining bitumen using a secondary lighter solvent of heptane. The fresh solution of secondary solvent was pumped into the plate and frame filter press across the first solvent-wet tailings at a secondary solvent to original bitumen weight ratio of 0.79:1. The plate and frame filter press was pressurized with inert atmosphere while the first solvent-second solvent mixture was collected at the outlet of the filter. The first solvent-second solvent mixture included 3.3 kg of bitumen and 19.0 kg of second solvent. The first solvent-second solvent mixture was sent to an evaporation separation process to recycle the secondary solvent. The second solvent-wet tailings remaining in the plate and frame filter press included 0.2 kg bitumen and 8 kg of secondary solvent.

The second solvent-wet tailings loaded in the plate and frame filter press were pressurized with heated inert gas to vaporize the residual secondary solvent and produce final solvent-dry, stackable tailings for discharge. After vaporization, the solvent-dry, stackable tailings had a total weight of 176.0 kg, including 0.2 kg bitumen and 0.1 kg secondary solvent.

Table 1 summarizes the measurements taken of various samples throughout the experiment.

TABLE 1

Mass Balance for Solvent Extraction of Bitumen in a Plate and Frame Filter Press Apparatus

|  | Mass kg | Bitumen Mass kg | Solvent Mass Kg | Stage Bitumen Recovery |
|---|---|---|---|---|
| Feed | 200.0 | 24.0 | 25.0 |  |
| First Stage Liquid Extract |  | 14.0 | 15.0 | 58.4% |
| Primary solvent wash stage liquid extract |  | 6.5 | 18.0 | 26.9% |
| Secondary Solvent wash stage liquid extract |  | 3.3 | 19.0 | 13.7% |
| Wet Sand Tailings |  | 0.2 | 8.0 | 0 |
| Dry Sand Tailings | 176.0 | 0.2 | 0.1 | 0 |

Example 2

Semi-Continuous Countercurrent Washing Using a Vertical Column

A second bitumen extraction experiment was conducted using a vertical column. 600.0 kg of oil sand ore having a bitumen content of about 12 wt % was mixed with a primary solvent of Solvesso 150. The primary solvent to bitumen ratio was about 0.84:1. The primary solvent and oil sand ore was mixed for 15 minutes in a disaggregation device.

The ore/solvent mixture was removed from the disaggregation device and pumped to the top end of the vertical column. The vertical column was filled with the ore/solvent mixture until a bed of full height was formed, and the top end of the vertical column was then sealed. The vertical column had a height of 6 feet and a inner diameter of 22 inches. The vertical column was pressurized with an inert gas and the bitumen-enriched solvent phase was collected at the bottom end of the vertical column. The bitumen-enriched solvent phase weighed 75.3 kg, including 37.3 kg of bitumen and 38.0 kg of primary solvent. First solvent-wet tailings remained in the vertical column.

A fresh solution of primary solvent was pumped into the top end of the vertical column at a solvent to original bitumen weight ratio of 0.73:1. The vertical column was pressurized with inert atmosphere and the fresh primary solvent was forced through the first solvent-wet tailings in a plug flow 'washing' action. The secondary bitumen-enriched solvent phase was collected at the bottom end of the vertical column. The secondary bitumen-enriched solvent phase weighed 78 kg, including 25 kg of bitumen and 53 kg of primary solvent. The first solvent-wet tailings remained in the vertical column.

The first solvent-wet tailings remaining in the vertical column were cleaned of residual primary solvent and any remaining bitumen using a secondary lighter solvent of heptane. The fresh solution of secondary solvent was pumped into the top end of the vertical column at a secondary solvent to original bitumen weight ratio of 0.68:1. The vertical column was pressurized with inert atmosphere while the first solvent-second solvent mixture was collected at the bottom end of the vertical column. The first solvent-second solvent mixture included 9.8 kg of bitumen and 50.0 kg of second solvent. The first solvent-second solvent mixture was sent to a evaporation separation process to recycle the secondary solvent. The second solvent-wet tailings remaining in the vertical column included 0.4 kg bitumen and 49 kg of secondary solvent.

The second solvent-wet tailings loaded in the vertical column were pressurized with heated inert gas to vaporize the residual secondary solvent and produce final solvent-dry, stackable tailings for discharge. After vaporization, the solvent-dry, stackable tailings had a total weight of 528.0 kg, including 0.4 kg bitumen and 0.2 kg secondary solvent.

Table 2 summarizes the measurements taken of various samples throughout the experiment.

TABLE 2

Mass Balance for Solvent Extraction of Bitumen in a Vertical Column Apparatus

| | Mass kg | Bitumen Mass kg | Solvent Mass Kg | Stage Bitumen Recovery |
|---|---|---|---|---|
| Feed | 600.0 | 73.0 | 61.0 | |
| First Stage Liquid Extract | | 37.3 | 38.0 | 51.1% |
| Primary solvent wash stage liquid extract | | 25.3 | 53.0 | 34.7% |
| Secondary Solvent wash stage liquid extract | | 9.8 | 50.0 | 13.4% |
| Wet Sand Tailings | | 0.4 | 49.0 | 0 |
| Dry Sand Tailings | 528.0 | 0.4 | 0.2 | 0 |

3. Continuous Countercurrent Washing Example Using a Screw Classifier 50.0 kg of oil sand ore containing about 11 wt % bitumen content was mixed with a primary solvent of Solvesso 150. The primary solvent was added to the oil sand ore at a primary solvent to original bitumen weight ratio of about 2.3:1. The oil sand ore and primary solvent were mixed for about 15 minutes in a disaggregation device.

The ore/solvent mixture was removed from the disaggregation device and a solid-liquid separation was performed in a settling device to drain the bitumen-enriched solvent phase from the first solvent-wet tailings. The first solvent-wet tailings contained around 7.3 wt % bitumen. The bitumen-enriched solvent phase weighed 6.5 kg, including 2.0 kg bitumen and 4.5 kg primary solvent.

The first solvent-wet tailings were fed to a dewatering screw classifier. The first solvent-wet tailings were added to the dewatering screw classifier feed well at a rate of about 1 kg/minute with a maximum feed rate of about 1.2 kg/minute. The helical dewatering screw classifier pulled the first solvent-wet tailings up from the feed well to a discharge at the top of the dewatering screw classifier, while the liquid component of the first solvent-wet tailings drained back to form a pool and overflow at the feed box of the dewatering screw classifier.

Primary solvent was added approximately ⅓ of the distance up the dewatering screw classifier at a rate of 45 wt % of the feed mass. The primary solvent was delivered by spray nozzles. The primary solvent removed the remaining bitumen-enriched solvent phase from the first solvent-wet tailings as it flowed through the first solvent-wet tailings and down the apparatus, forming a pool at the bottom of the screw classifier and then overflowing into a product drum. The bitumen-enriched solvent phase weighed 25.7 kg, including 3.0 kg bitumen and 22.7 kg primary solvent.

The first solvent-wet tailings were discharged from the top of the apparatus and passed to a second dewatering screw classifier for secondary solvent washing. A second stage washing was conducted across a second dewatering screw classifier in the same manner as the primary wash using a lighter solvent to wash out the residual primary solvent and any remaining bitumen. The secondary solvent was heptane, and was added at a rate of about 35 wt % the feed mass. The first solvent-second solvent mixture included 0.3 kg bitumen and 2.2 kg secondary solvent.

The second solvent-wet tailings after the secondary washing stages were sent to a secondary solvent recovery stage to remove the secondary solvent. The second solvent-wet tailings included 0.0 kg of bitumen and 17.0 kg of secondary solvent. The secondary solvent was evaporated in a separate rotary drying stage to recover residual second solvent. The solvent-dry, stackable tailings produced after separating the second solvent had a total mass of 45.0 kg, including 0.1 kg of bitumen and 0.1 kg of secondary solvent.

Table 3 summarizes the measurements taken of various samples throughout the experiment.

TABLE 3

Mass Balance for Solvent Extraction of Bitumen in Dewatering Screw Classifier

| | Mass kg | Bitumen Mass kg | Solvent Mass kg | Stage Bitumen Recovery |
|---|---|---|---|---|
| Feed | 50.0 | 5.3 | 12.0 | |
| First Stage Liquid Extract | | 2.0 | 4.5 | 36.8% |

TABLE 3-continued

Mass Balance for Solvent Extraction of
Bitumen in Dewatering Screw Classifier

|  | Mass kg | Bitumen Mass kg | Solvent Mass kg | Stage Bitumen Recovery |
|---|---|---|---|---|
| Primary solvent wash stage(s) liquid extract |  | 3.0 | 22.7 | 56.6% |
| Secondary Solvent wash stage(s) liquid extract |  | 0.3 | 2.2 | 5.7% |
| Wet Sand Tailings |  | 0.0 | 17.0 | 0 |
| Dry Sand Tailings | 45.0 | 0.1 | 0.1 | 0 |

4. Continuous Countercurrent Washing Example Using a Dewatering Screen 200.0 kg of oil sand ore containing about 12 wt % bitumen content was mixed with a primary solvent of Solvesso 150. The primary solvent was added to the oil sand ore at a primary solvent to original bitumen weight ratio of about 3.8:1. The oil sand ore and primary solvent were mixed for about 15 minutes in a disaggregation device.

The ore/solvent mixture was removed from the disaggregation device and a solid-liquid separation was performed in a settling device to drain the bitumen-enriched solvent phase from the first solvent-wet tailings. The first solvent-wet tailings contained 3 wt % bitumen. The bitumen-enriched solvent phase weighed 81.6 kg, including 17.6 kg bitumen and 64 kg primary solvent.

The first solvent-wet tailings were then passed directly to a dewatering screen having an aspect ratio of 1. A primary solvent was sprayed onto the dewatering screen at around ⅓ of the distance up the dewatering screen. The primary solvent was added at a rate of 35 wt % the feed mass. Bitumen-enriched solvent phase was collected into compartments under the dewatering screen. The bitumen-enriched solvent phase weighed 75.3 kg, including 5.3 kg bitumen and 70.0 kg primary solvent.

A secondary solvent was sprayed onto the dewatering screen at around ⅓ of the distance up the dewatering screen. The secondary solvent was heptane, and was added at a rate of 10 wt % the feed mass. First solvent-second solvent mixture was collected into compartments under the dewatering screen. The first solvent-second solvent included 1.0 kg bitumen and 4.0 kg secondary solvent.

The second solvent-wet tailings after the secondary washing stage were sent to a secondary solvent recovery stage to remove the secondary solvent. The second solvent-wet tailings included 0.1 kg of bitumen and 17.0 kg of secondary solvent. The secondary solvent was evaporated in a separate rotary drying stage to recover residual second solvent. The solvent-dry, stackable tailings produced after separating the second solvent had a total mass of 175.0 kg, including 0.1 kg of bitumen and 0.1 kg of secondary solvent.

Table 4 summarizes the measurements taken of various samples throughout the experiment.

TABLE 4

Mass Balance for Solvent Extraction
of Bitumen Over a Dewatering Screen

|  | Mass kg | Bitumen Mass kg | Solvent Mass kg | Stage Bitumen Recovery |
|---|---|---|---|---|
| Feed | 200.0 | 24.0 | 90.0* |  |
| First Stage Liquid Extract |  | 17.6 | 64.0 | 73.4% |
| Primary solvent wash stage(s) liquid extract |  | 5.3 | 70.0 | 22.2% |
| Secondary Solvent wash stage(s) liquid extract |  | 1.0 | 4.0 | 4.2% |
| Wet Sand Tailings |  | 0.1 | 17.0 | 0 |
| Dry Sand Tailings | 175.0 | 0.1 | 0.1 | 0 |
| Balance Closure |  | 100.0% | 99.8% |  |
| Recovery |  | 100.0% | 99.9% |  |

*Countercurrent flow includes recycle bitumen from prior washings stages

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A method comprising:
    forming a first mixture by mixing a material comprising bitumen with a first quantity of first solvent, wherein the first mixture comprises a bitumen-enriched solvent phase;
    separating the bitumen-enriched solvent phase from the first mixture and thereby producing first solvent-wet tailings, wherein the first solvent-wet tailings comprise a first solvent component;
    separating the first solvent component from the first solvent-wet tailings by adding a second solvent to the first solvent-wet tailings and thereby producing second solvent-wet tailings, wherein the second solvent-wet tailings comprise a second solvent component; and
    separating the second solvent component from the second solvent-wet tailings and thereby forming solvent-dry, stackable tailings;
    wherein the first solvent is a different type of solvent from the second solvent.

2. The method as recited in claim 1, wherein separating the bitumen-enriched solvent phase from the first mixture comprises:
    separating a first quantity of the bitumen-enriched solvent phase from the first mixture by filtering, settling or draining the bitumen-enriched solvent phase from the first mixture; and
    separating a second quantity of the bitumen-enriched solvent phase from the first mixture by adding a second quantity of first solvent to the first mixture.

3. The method as recited in claim 2, wherein separating the second quantity of the bitumen-enriched solvent phase from the first mixture comprises washing the first mixture with the second quantity of first solvent in a countercurrent process.

4. The method as recited in claim 1, wherein separating the first solvent component from the first solvent-wet tailings comprises washing the first solvent-wet tailings with the second solvent in a countercurrent process.

5. The method as recited in claim 1, wherein separating the second solvent from the second solvent-wet tailings comprises flashing the second solvent component from the second solvent-wet tailings.

6. The method as recited in claim 1, wherein the first solvent comprises a light aromatic solvent.

7. The method as recited in claim 6, wherein the light aromatic solvent comprises kerosene, diesel, gas oil, naphtha, benzene, toluene, an aromatic alcohol, derivatives thereof, or a combination thereof.

8. The method as recited in claim 1, wherein the second solvent comprises a volatile hydrocarbon solvent.

9. The method as recited in claim 8, wherein the volatile hydrocarbon solvent comprises a cyclo- or iso-paraffin having between 3 and 9 carbons derivatives thereof, or combinations thereof.

10. The method as recited in claim 1, wherein the second solvent comprises liquefied petroleum gas.

11. The method as recited in claim 1, wherein separating the bitumen-enriched solvent phase from the first mixture comprises filtering the first mixture in a plate and frame-type filter press.

12. The method as recited in claim 11, wherein filtering the first mixture in a plate and frame-type filter press further comprises adding a gas over the first mixture loaded in the plate and frame-type filter press.

13. The method as recited in claim 1, wherein separating the first solvent component from the first solvent-wet tailings comprises filtering the first solvent-wet tailings in a plate and frame-type filter press.

14. The method as recited in claim 13, wherein filtering the first solvent-wet tailings in a plate and frame-type filter press further comprises adding a gas over the first solvent-wet tailings loaded in the plate and frame-type filter press.

15. The method as recited in claim 1, wherein the material comprising bitumen comprises tar sands.

16. The method as recited in claim 1, wherein the solvent-dry, stackable tailings comprise less than 0.1 wt % first solvent and second solvent.

17. Solvent-dry, stackable tailings produced by the method recited in claim 1.

18. The method as claimed in claim 1, further comprising:
upgrading a bitumen component of the bitumen-enriched solvent phase.

19. A method comprising:
forming a first mixture by mixing material comprising bitumen with a first quantity of first solvent;
loading the first mixture in a vertical column having a top end and bottom end;
injecting a second quantity of first solvent into the first mixture loaded in the vertical column at the top end of the vertical column;
collecting a bitumen-enriched solvent phase at the bottom end of the vertical column;
injecting a first quantity of second solvent into the first mixture loaded in the vertical column at the top end of the vertical column;
collecting a first solvent-enriched second solvent phase at the bottom end of the vertical column; and
discharging the first mixture from the vertical column;
wherein the first solvent is a different type of solvent from the second solvent.

20. The method as recited in claim 19, further comprising adding a gas over the top end of the vertical column prior to injecting the second quantity of first solvent.

21. The method as recited in claim 19, further comprising adding a gas over the top end of the vertical column after injecting the second quantity of first solvent and prior to injecting the first quantity of second solvent.

22. The method as recited in claim 19, further comprising adding a gas over the top end of the vertical column after injecting the first quantity of second solvent.

23. The method as recited in claim 19, wherein the first solvent comprises a light aromatic solvent.

24. The method as recited in claim 23, wherein the light aromatic solvent comprises kerosene, diesel, gas oil, naphtha, benzene, toluene, an aromatic alcohol, derivatives thereof, or a combination thereof.

25. The method as recited in claim 19, wherein the second solvent comprises a volatile hydrocarbon solvent.

26. The method as recited in claim 25, wherein the volatile hydrocarbon solvent comprises a cyclo- or iso-paraffin having between 3 and 9 carbons, derivatives thereof, or combinations thereof.

27. The method as recited in claim 19, wherein the second solvent comprises liquefied petroleum gas.

28. The method as recited in claim 19, wherein the material comprising bitumen comprises tar sands.

29. The method as recited in claim 19, further comprising separating a residual amount of second solvent from the first mixture prior to discharging the first mixture from the vertical column.

30. The method as recited in claim 29, wherein separating a residual amount of second solvent from the first mixture comprises injecting a heated gas into the first mixture to evaporate the residual second solvent.

31. The method as recited in claim 19, further comprising separating a residual amount of second solvent from the first mixture after discharging the first mixture from the vertical column.

32. The method as recited in claim 31 wherein separating a residual amount of second solvent from the first mixture comprises injecting a heated gas into the first mixture to evaporate the residual second solvent.

33. Solvent-dry, stackable tailings produced by the method recited in claim 19.

34. The method as claimed in claim 19, further comprising:
upgrading a bitumen component of the bitumen-enriched solvent phase.

35. A method comprising:
mixing a material comprising bitumen with a first quantity of first solvent;
separating a bitumen-enriched solvent phase from a first result of mixing the material comprising bitumen with the first quantity of first solvent mixture;
separating a first solvent component from a second result of separating the bitumen-enriched solvent phase from the first result; and
separating a second solvent component from a third result of separating the first solvent component from the second result;
wherein the first solvent is a different type of solvent from the second solvent.

36. The method as recited in claim 35, wherein separating the bitumen-enriched solvent phase from the first result of mixing the material comprising bitumen with the first quantity of first solvent mixture comprises:
filtering, settling or draining a first quantity of bitumen-enriched solvent phase from the first result of mixing the material comprising bitumen with the first quantity of first solvent mixture; and
adding a second quantity of first solvent to the first result of mixing the material comprising bitumen with the first quantity of first solvent mixture.

37. The method as claimed in claim 35, further comprising:
upgrading a bitumen component of the bitumen-enriched solvent phase.

38. A method comprising:
mixing material comprising bitumen with a first quantity of first solvent;
loading a first result of mixing material comprising bitumen with a first quantity of first solvent in a vertical column having a top end and bottom end;
injecting a second quantity of first solvent into the first result loaded in the vertical column at the top end of the vertical column;
collecting a bitumen-enriched solvent phase at the bottom end of the vertical column;
injecting a first quantity of second solvent into the first result loaded in the vertical column at the top end of the vertical column;
collecting a first solvent-enriched second solvent phase at the bottom end of the vertical column; and
discharging the first result from the vertical column;
wherein the first solvent is a different type of solvent from the second solvent.

39. The method as claimed in claim 38, further comprising:
upgrading a bitumen component of the bitumen-enriched solvent phase.

* * * * *